United States Patent [19]

Ames et al.

[11] 4,128,876
[45] Dec. 5, 1978

[54] SYNCHRONOUS MICROCODE GENERATED INTERFACE FOR SYSTEM OF MICROCODED DATA PROCESSORS

[75] Inventors: Richard N. Ames; Dick K. Hardin; Joel C. Leininger; George P. Taylor, all of Boca Raton, Fla.

[73] Assignee: International Business Machines Corporation, Armonk, N.Y.

[21] Appl. No.: 792,085

[22] Filed: Apr. 28, 1977

[51] Int. Cl.² .............................................. G06F 3/00
[52] U.S. Cl. ............................................... 364/200
[58] Field of Search ......................... 364/200 MS File

[56] References Cited

U.S. PATENT DOCUMENTS

| 3,462,741 | 8/1969 | Bush et al. | 364/200 |
|---|---|---|---|
| 3,654,617 | 4/1972 | Irwin | 364/200 |
| 3,934,232 | 1/1976 | Curley et al. | 364/200 |
| 3,970,997 | 7/1976 | Daly et al. | 364/200 |

Primary Examiner—Raulfe B. Zache
Attorney, Agent, or Firm—Charles P. Boberg

[57] ABSTRACT

An interface comprising normal asynchronous I/O interface hardware in combination with certain additional synchronizing connections is provided between a microcoded central processing unit (CPU) and a microcoded secondary processor (such as a floating point processor) for enabling these processors to function conjointly under common timing control as though they were natively attached to each other insofar as the execution of their respective microcodes is concerned. The secondary processor shares the normal I/O interface with the I/O devices for data transfer purposes in such fashion that data can be transferred between any of the I/O devices and the CPU in cycle steal mode when the secondary processor is internally occupied with executing an operation delegated to it by the central processor, and when the secondary processor is ready to store data which it has produced, I/O data transfers in cycle steal mode can be made concurrently with data transfers between the secondary processor and the CPU on a demand multiplex basis. Coordinating signals are passed between the processors at certain steps during the execution of their respective microcodes to maintain these microcodes in proper timed relationship with each other.

14 Claims, 28 Drawing Figures

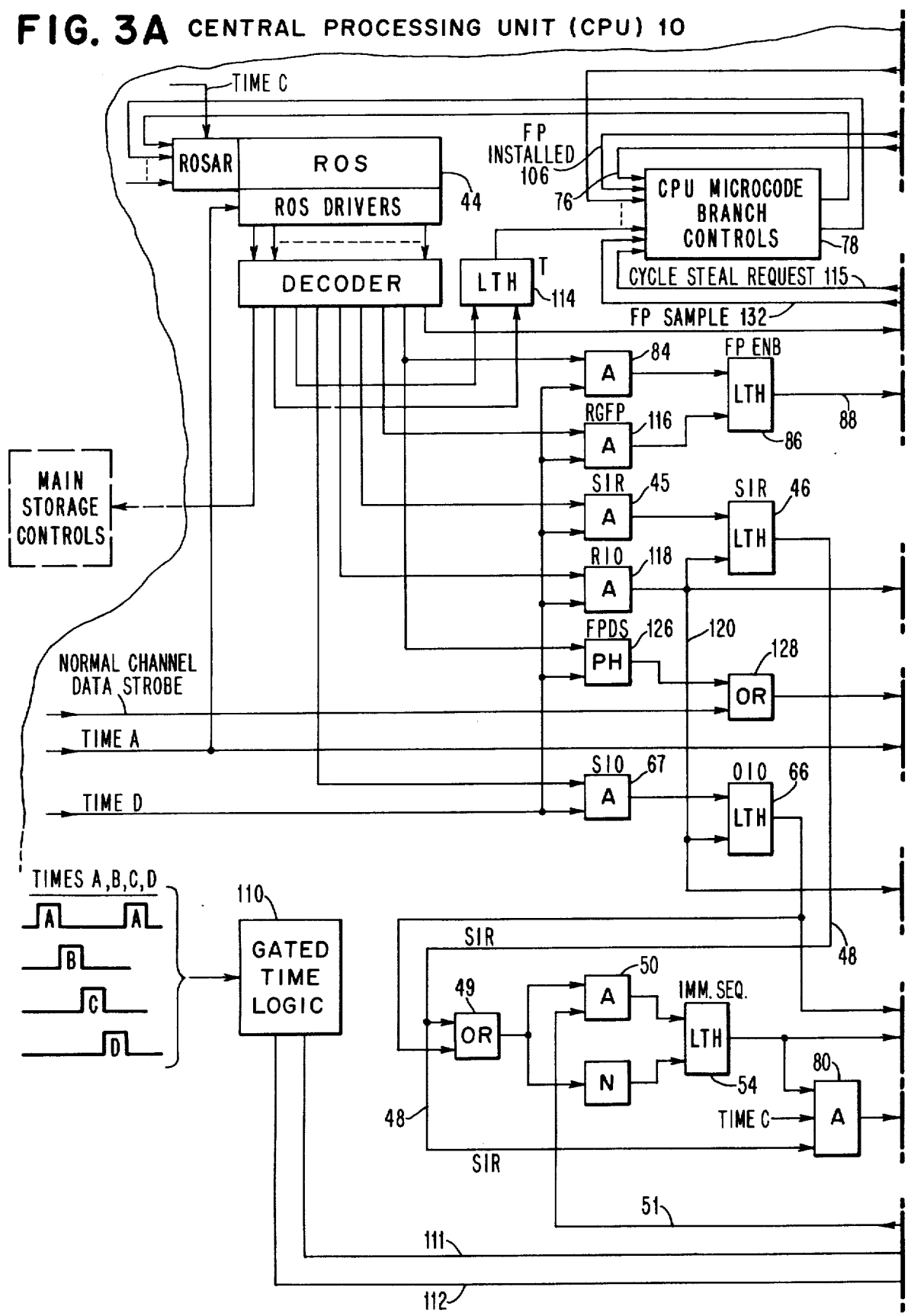
FIG. 3A CENTRAL PROCESSING UNIT (CPU) 10

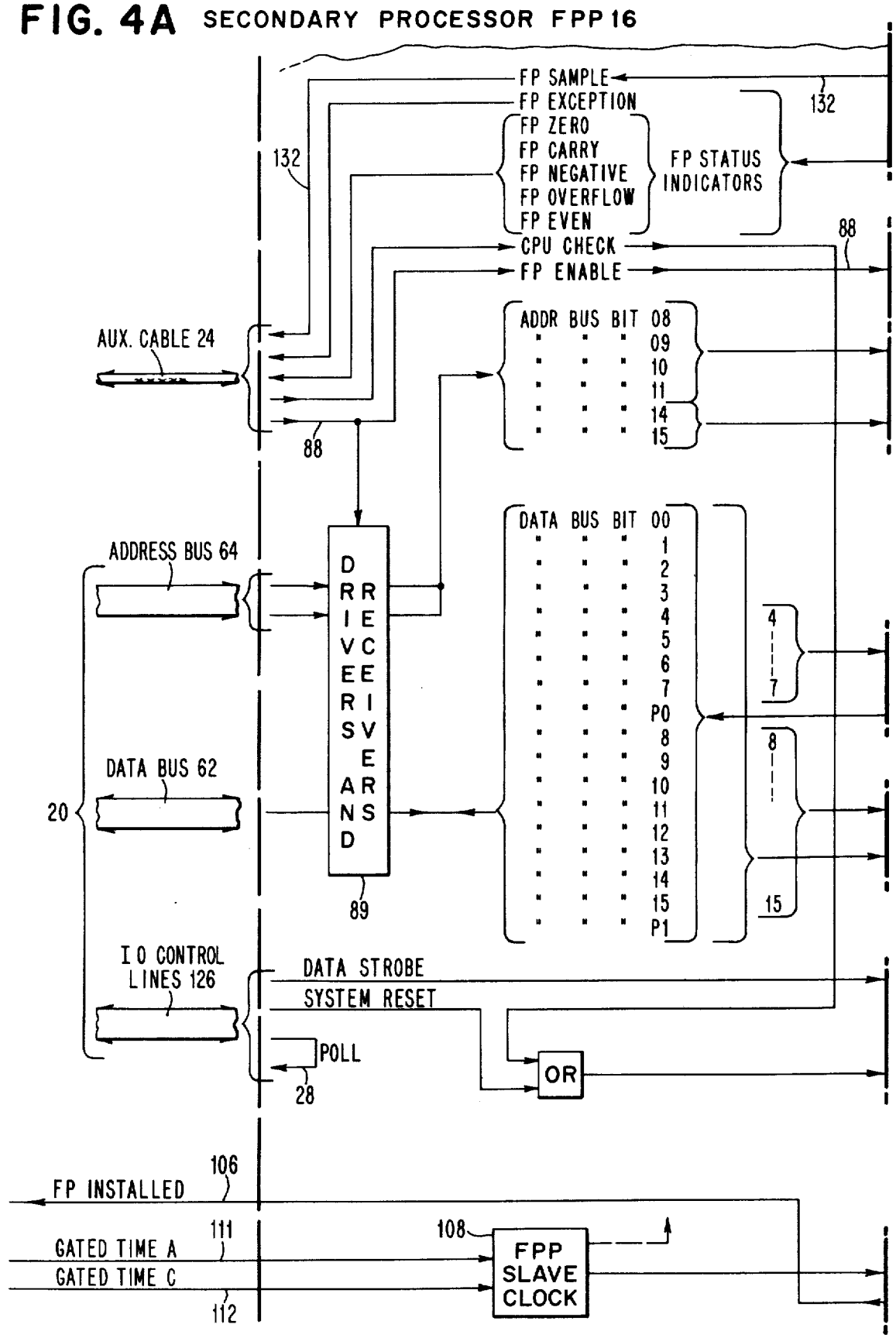
FIG. 4A SECONDARY PROCESSOR FPP 16

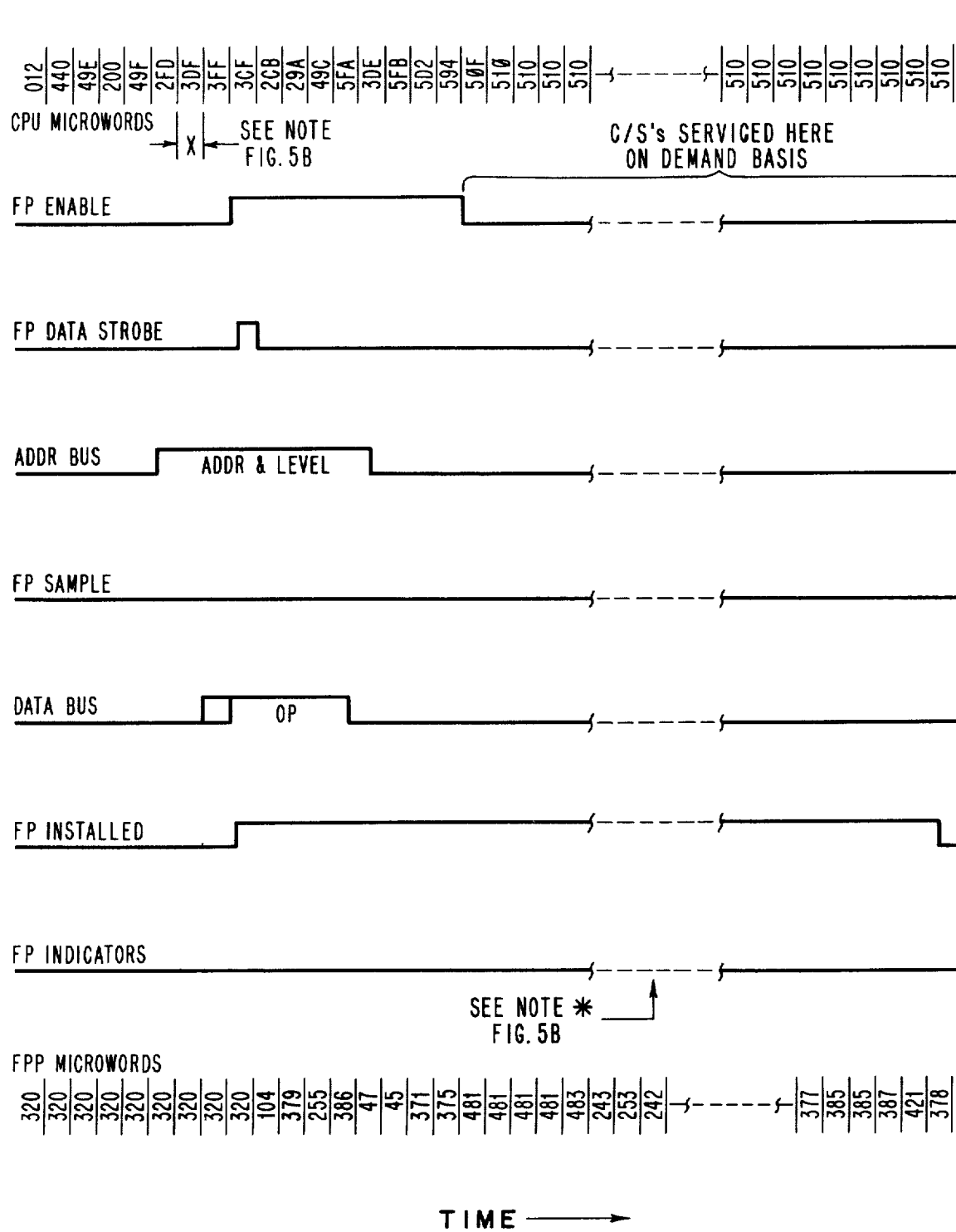

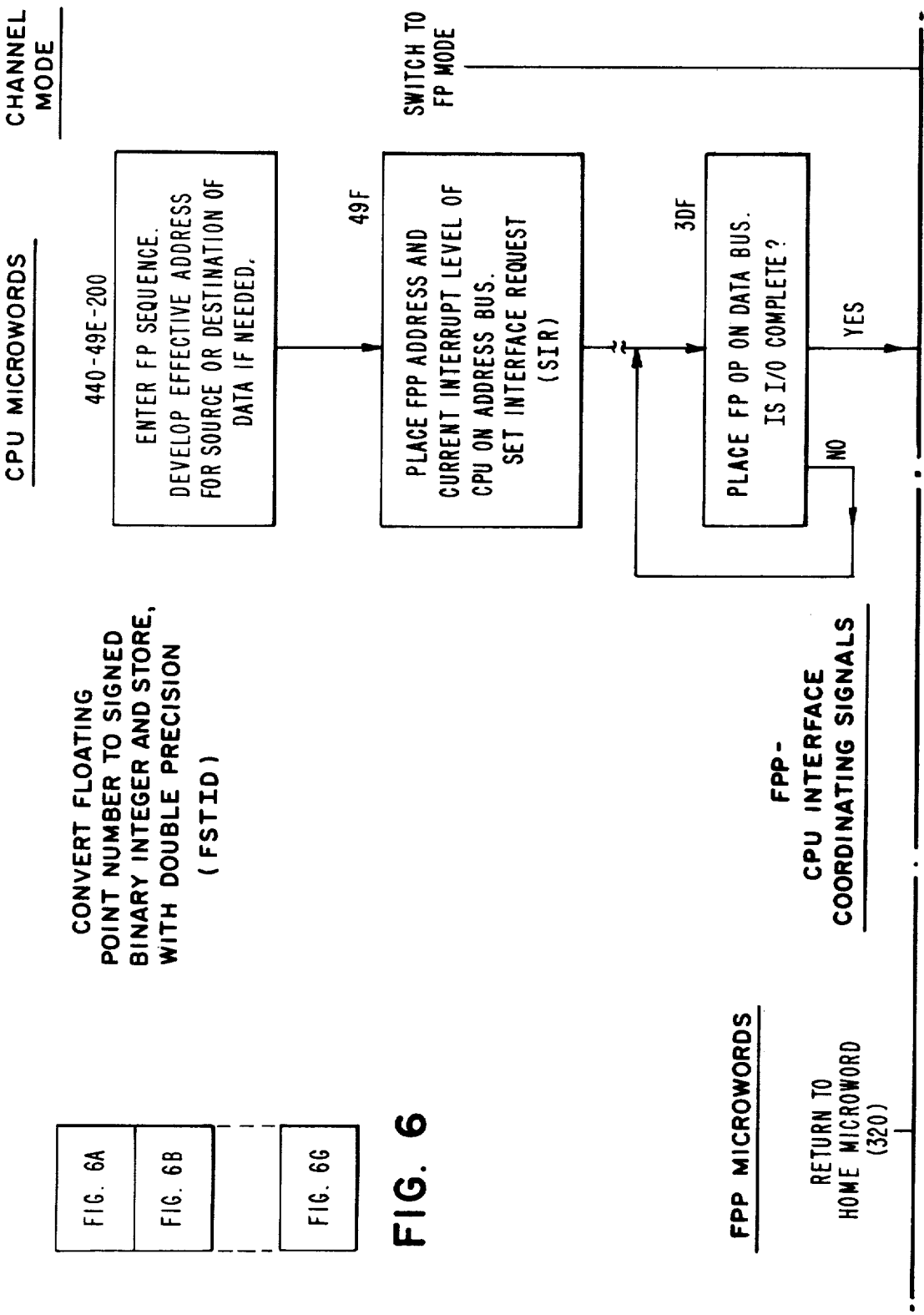

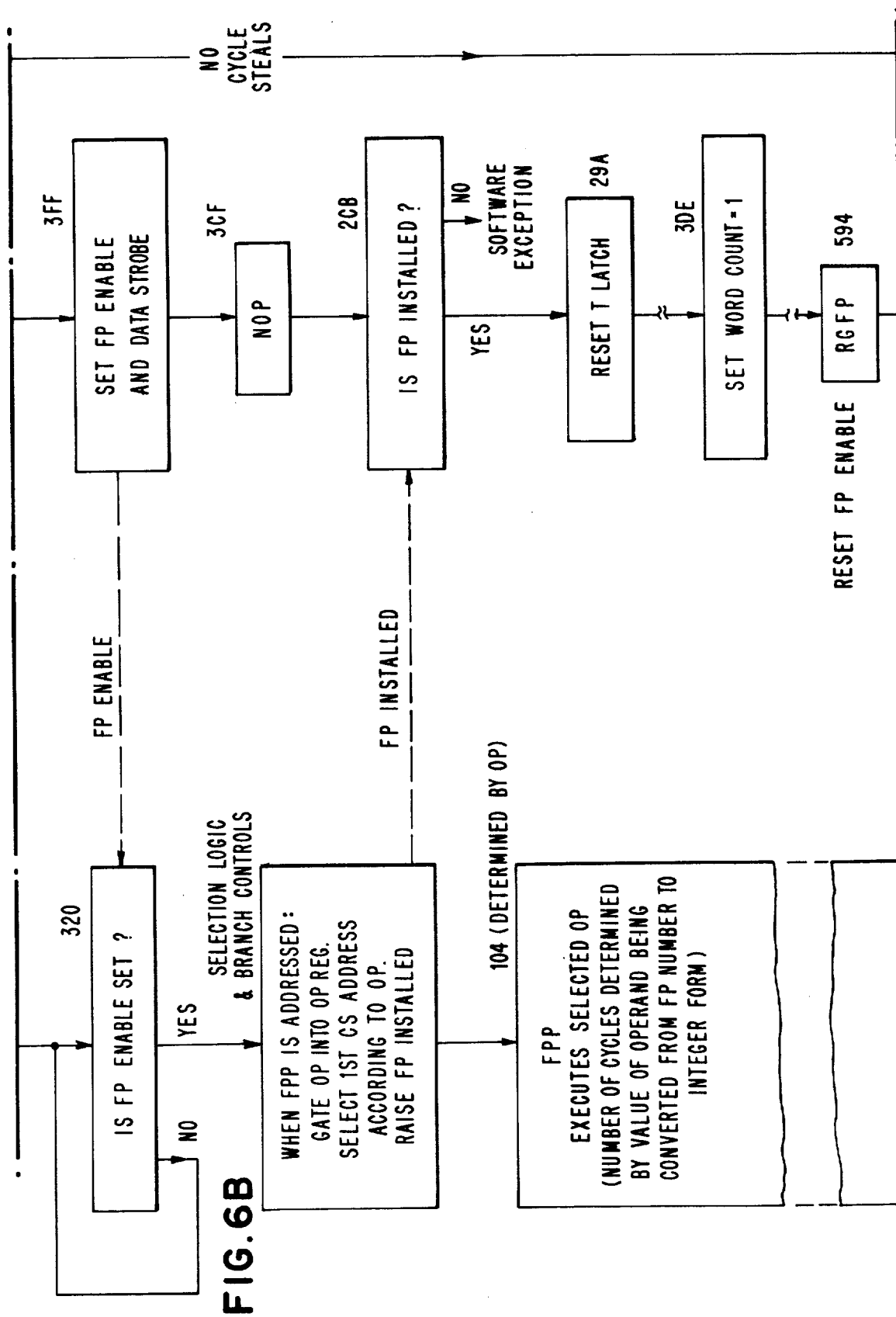

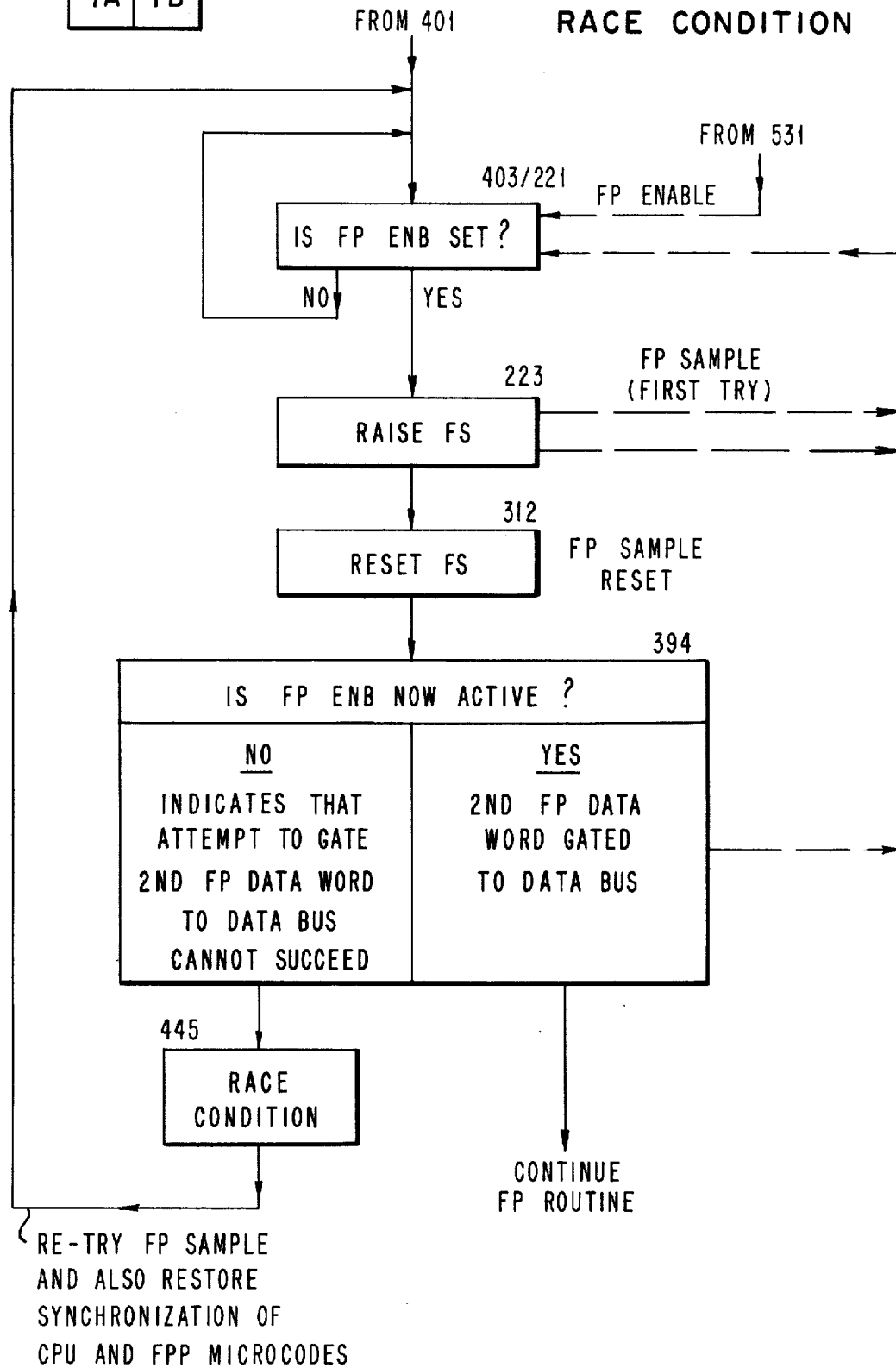

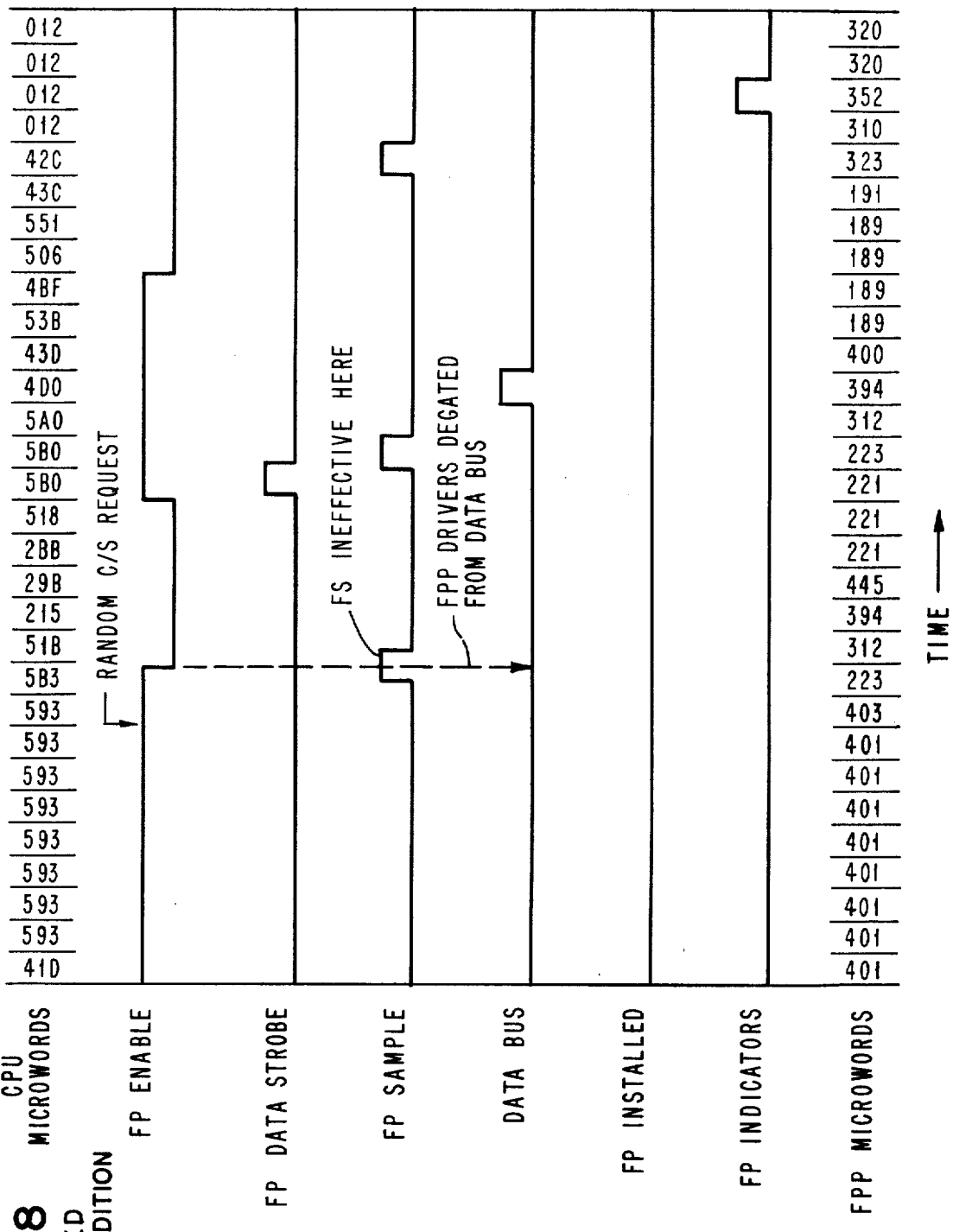

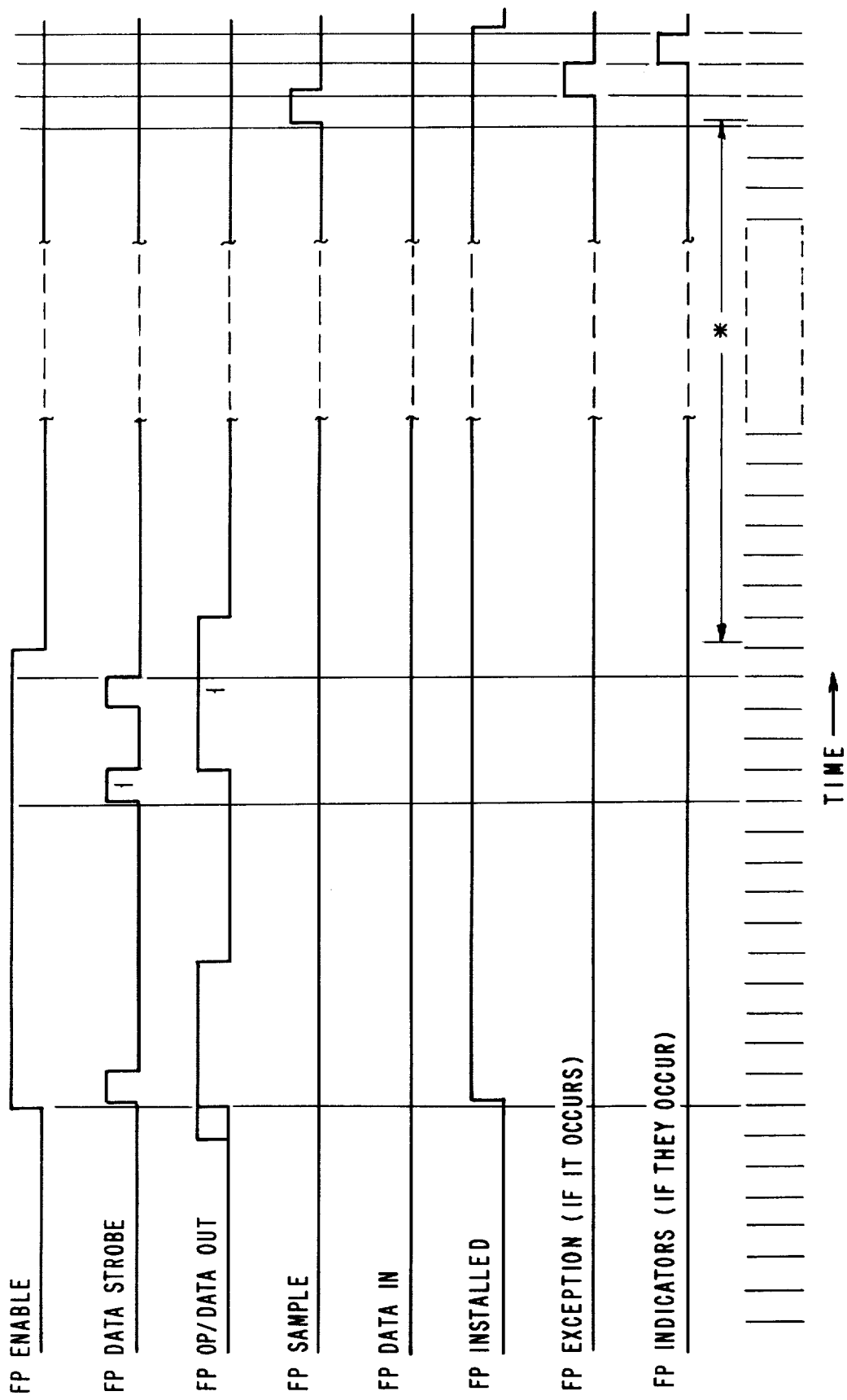

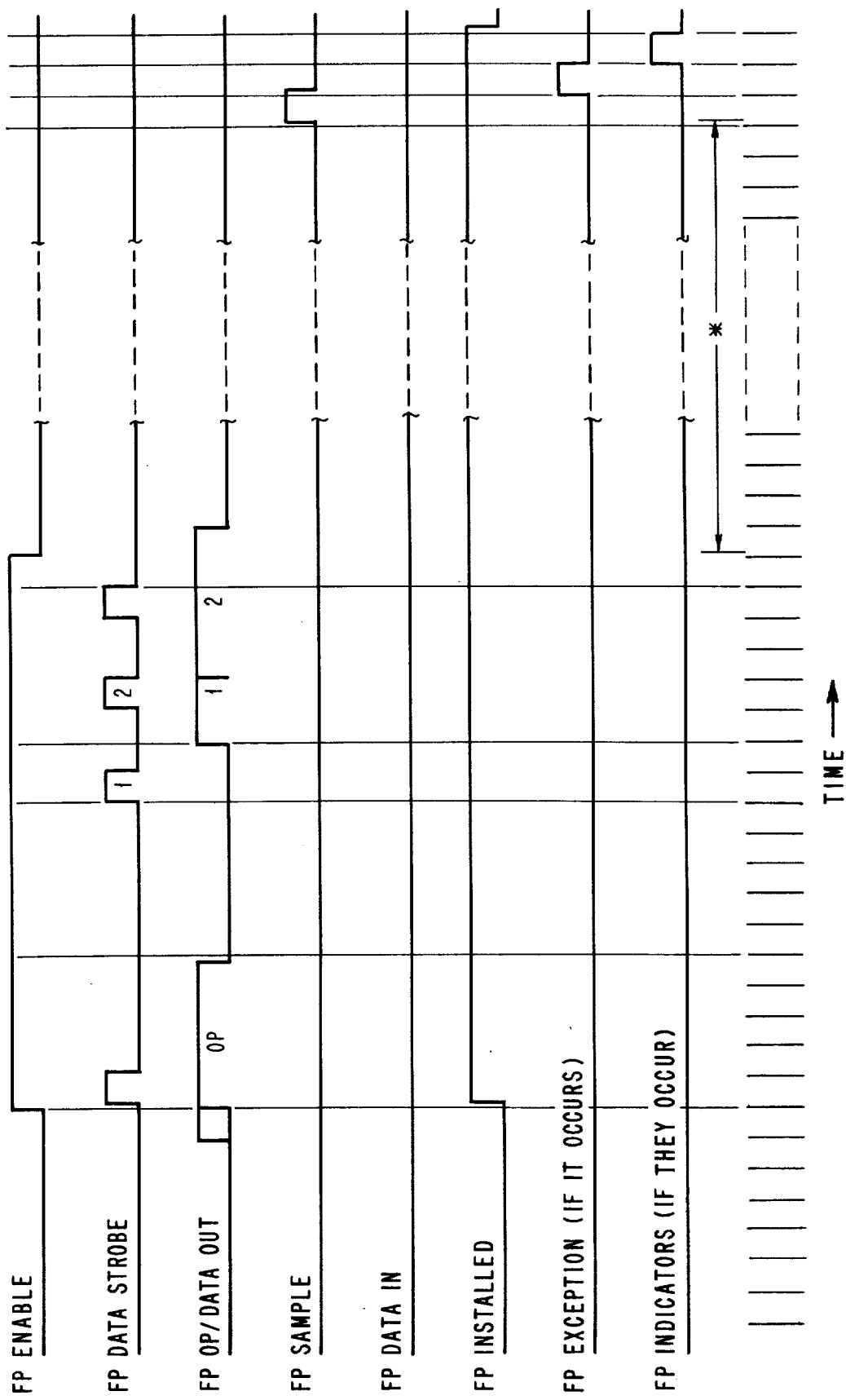

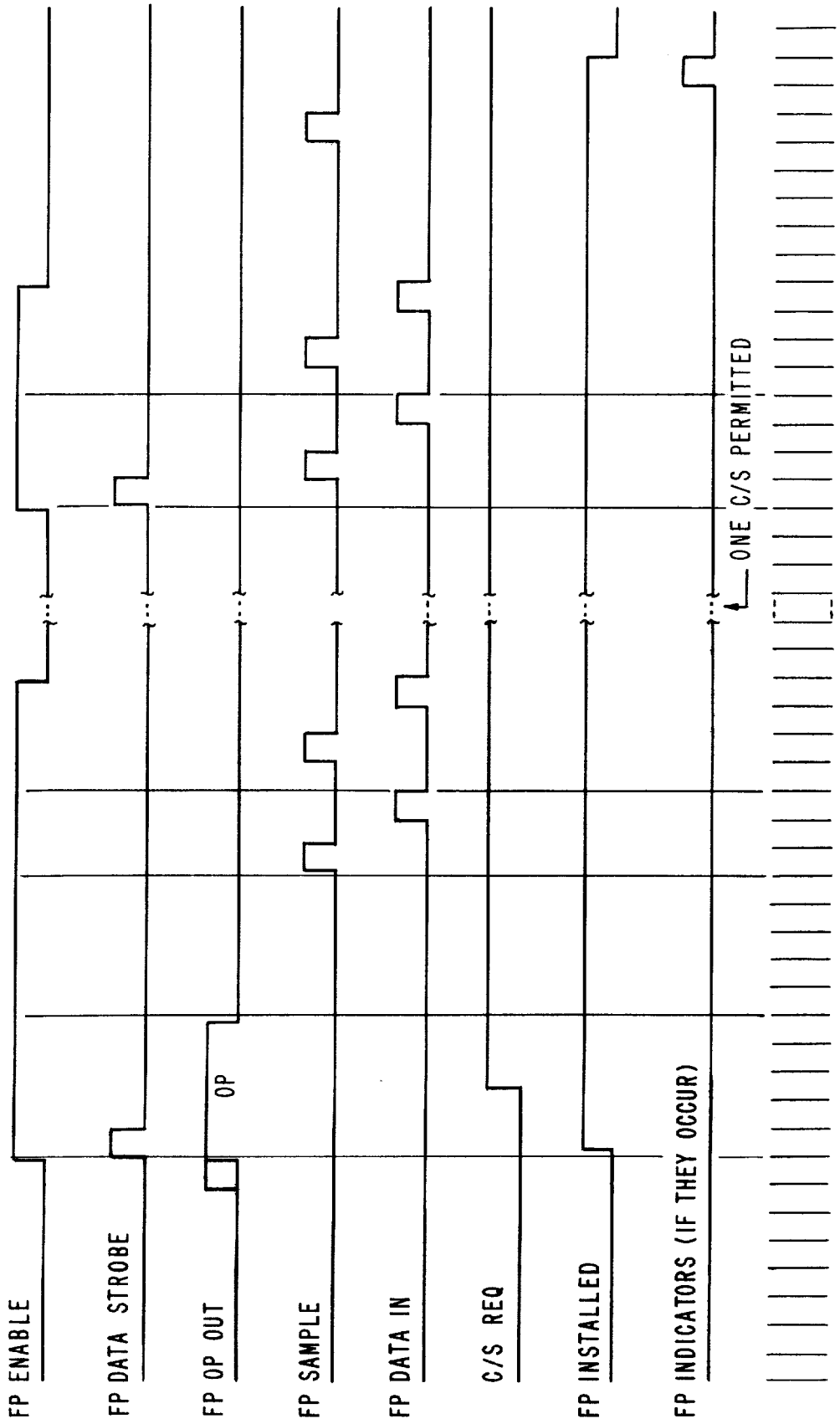

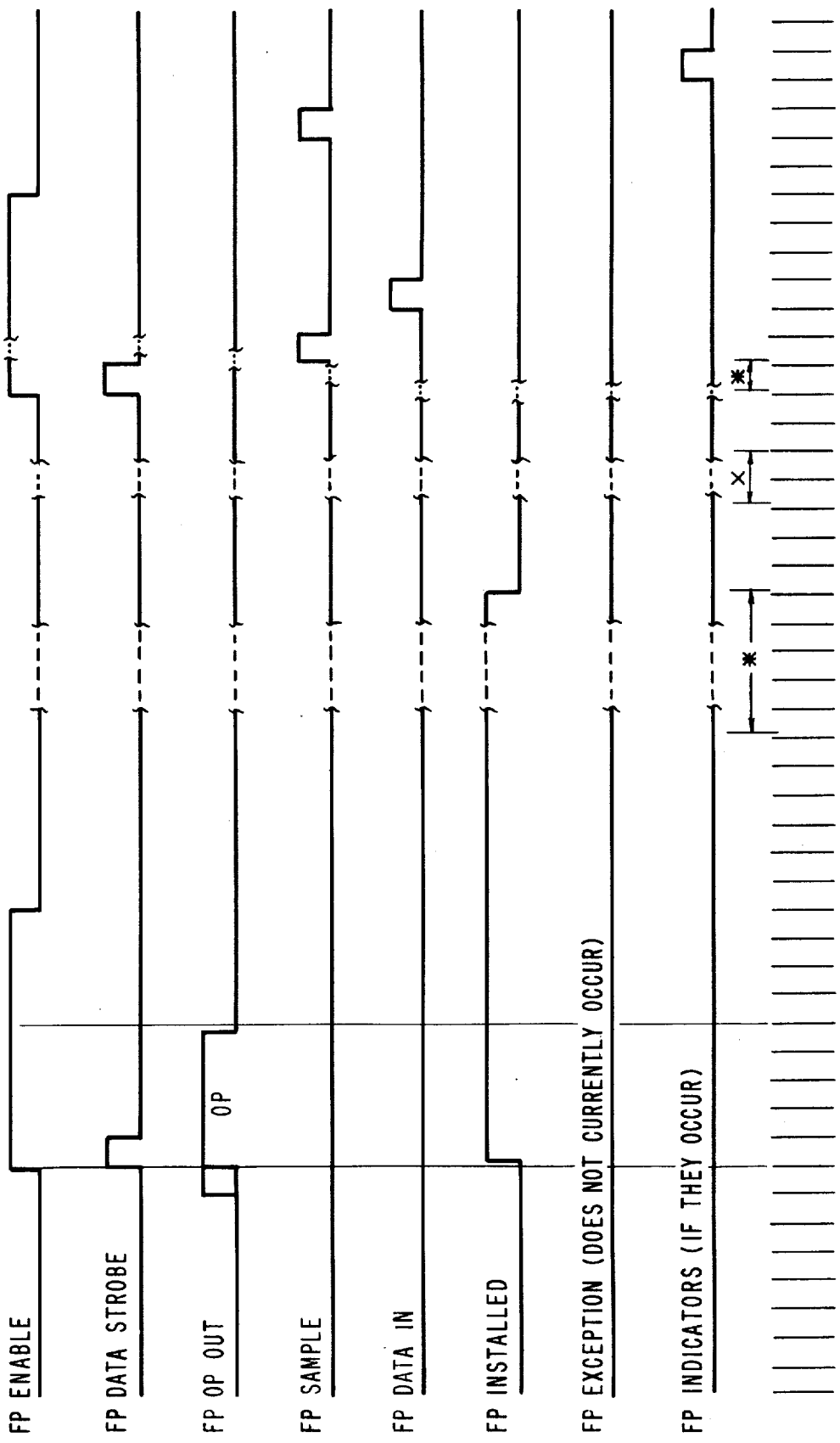

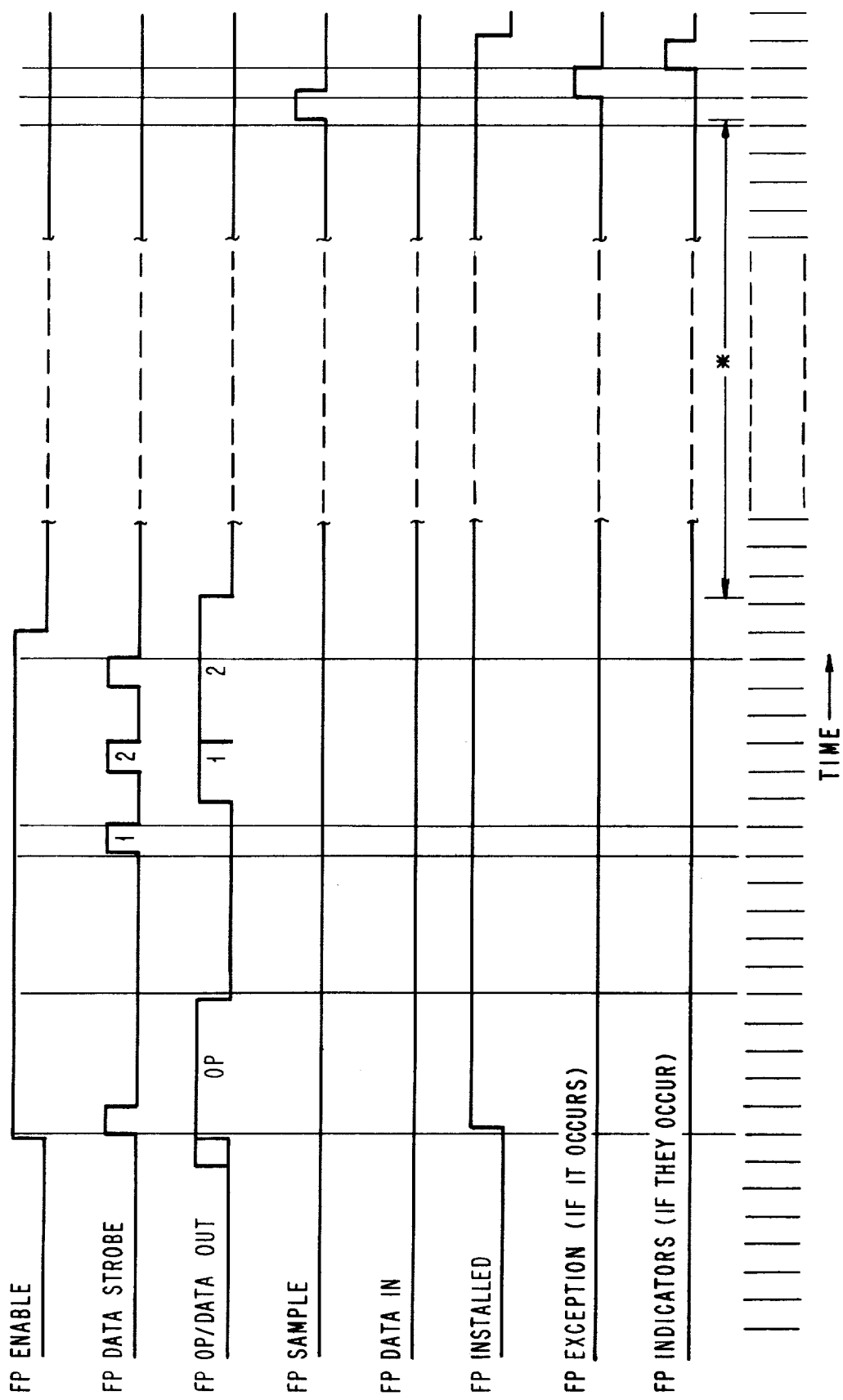

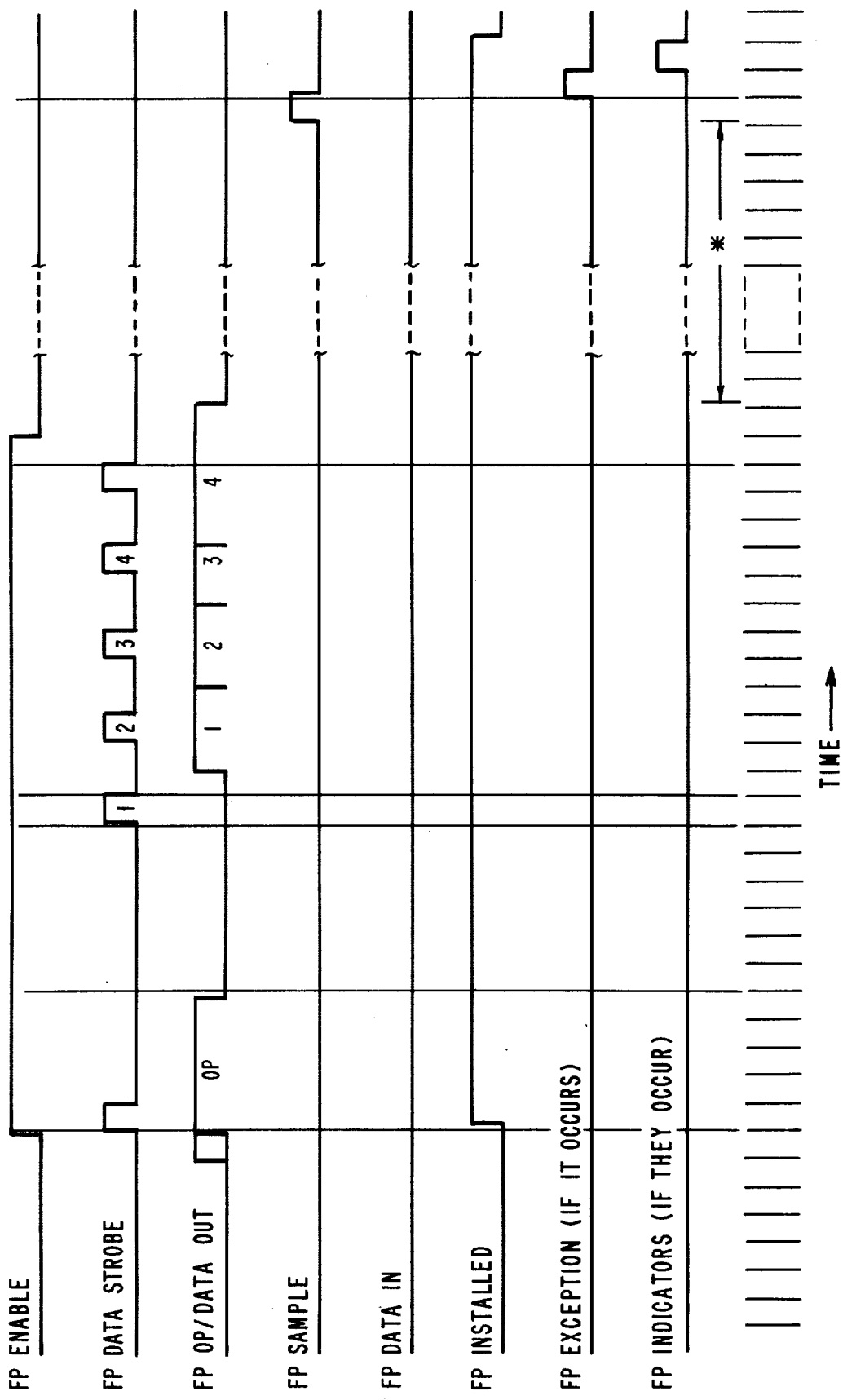

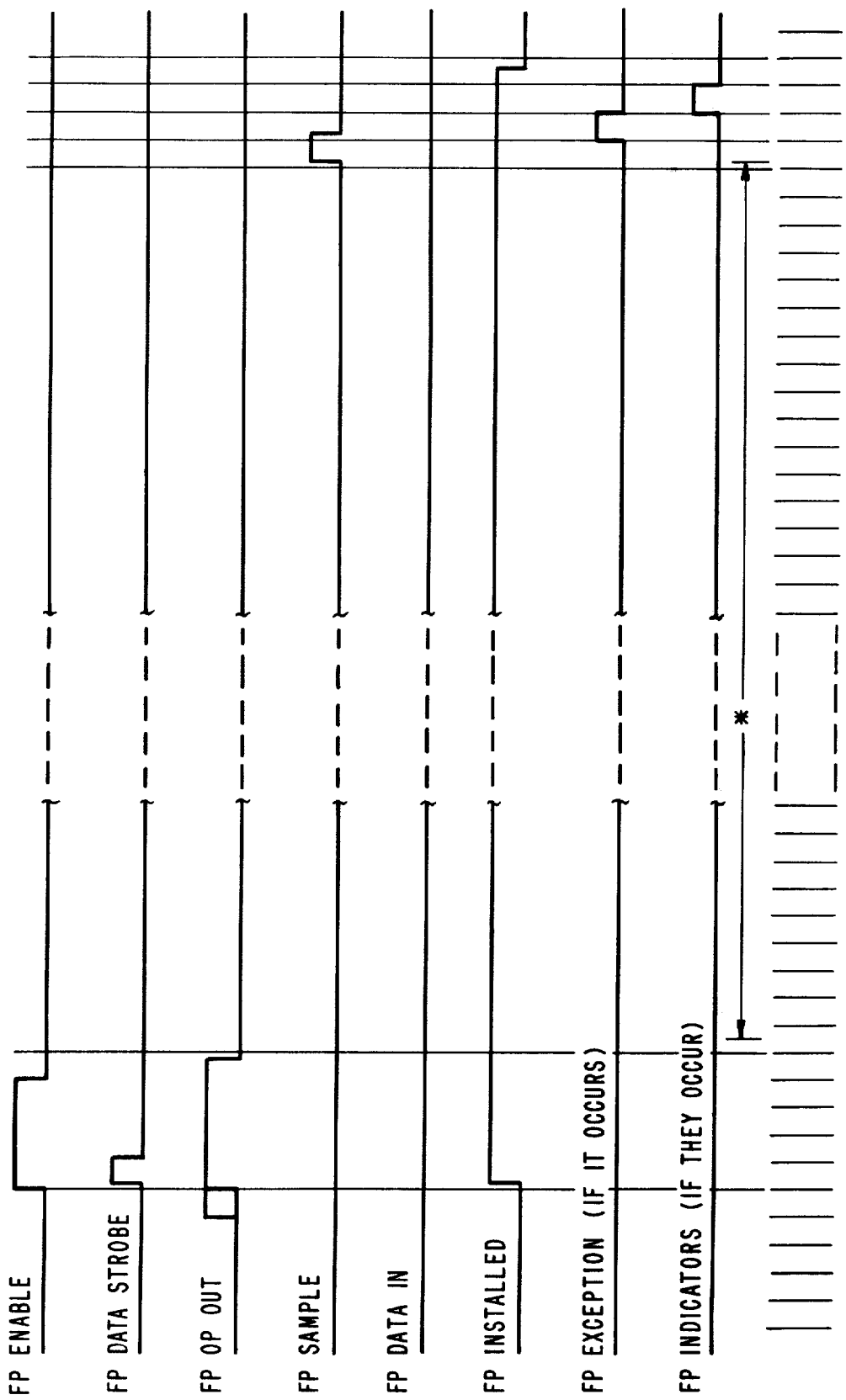

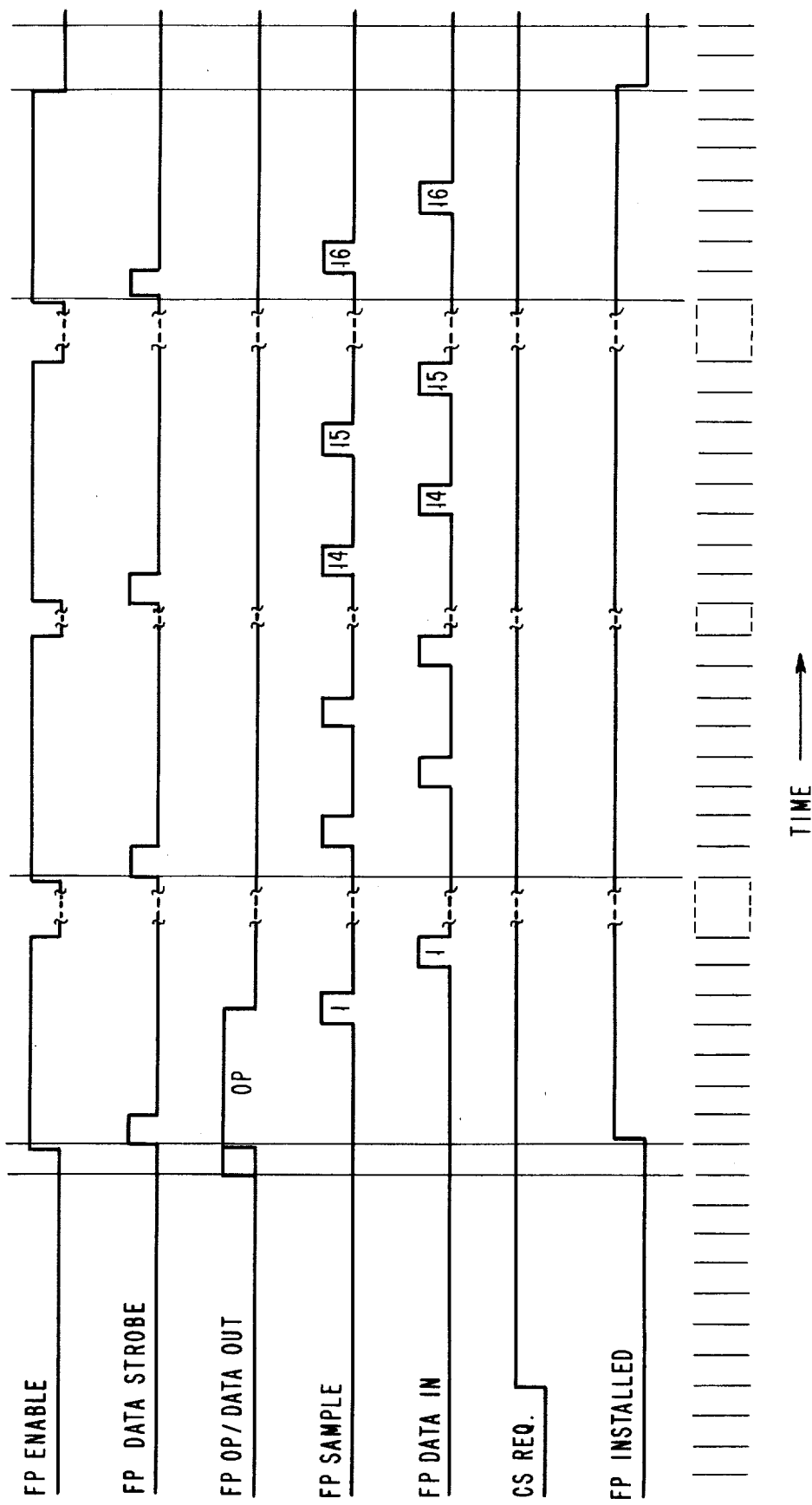
FIG. 14 FLOATING STORE LEVEL BLOCK (FSTLB)

SYNCHRONOUS MICROCODE GENERATED INTERFACE FOR SYSTEM OF MICROCODED DATA PROCESSORS

CROSS-REFERENCE TO RELATED APPLICATIONS

Applications, Ser. No. 792,078, by R. E. Birney, J. C. Leininger and G. P. Taylor, entitled "Divider Using Carry Save Adder with Nonperforming Lookahead" (now U.S. Pat. No. 4,084,254, issued Apr. 11, 1978), and Ser. No. 792,082, by J. C. Leininger and G. P. Taylor, entitled "Carry Save Adder," both filed of even date herewith and assigned to the assignee of the present application, describe and claim various aspects of the carry save adder which is referred to hereinafter as part of the floating point processor.

The present application also is related to the following other applications assigned to the assignee herein, each of which was filed on Apr. 30, 1976:

| Serial No. | Title | Inventor(s) |
|---|---|---|
| 681,953 (Pat. No. 4,047,161) | Task Management Apparatus | M.I. Davis |
| 682,002 (Pat. No. 4,041,462) | Data Processing System Featuring Subroutine Linkage Operations Using Hardware Controlled Stacks | M.I. Davis G.W. Mayes T.S. McDermott L.E. Wise |
| 681,983 (Pat. No. 4,038,641) | Common Polling Logic for Input/Output Interrupt or Cycle Steal Data Transfer Requests | M.A. Bouknecht D.G. Bourke L.P. Vergari |
| 682,229 (Pat. No. 4,038,642) | Input/Output Interface Logic for Concurrent Operations | M.A. Bouknecht M.I. Davis L.P. Vergari |

Each of the foregoing applications is incorporated herein by reference as if it were set forth herein in its entirety.

BACKGROUND OF THE INVENTION

This invention relates to modular data processing systems, especially those of the microprogrammed type, in which a central processing unit (CPU) that has exclusive control of main storage may delegate special data processing functions (other than storage management) to one or more auxiliary processors, sometimes referred to as "outboard" processors, each of which is optimally designed to perform a given set of data processing functions efficiently and economically. Such auxiliary processors preferably are made available as add-on units to those users who may require these specialized services. For example, a system may be arranged so that the CPU delegates those operations that involve the use of floating point arithmetic to a separate "floating point" processor which has its own control logic for handling such operations.

The modular concept of system design briefly described above enables a data processing system to serve a broad class of users whose needs may vary widely. Where a user does not require the sophisticated capability of a floating point processor, for instance, he may purchase only a basic system which does not include a built-in floating point processor. If he later requires such a processor, it may be added as an outboard unit to his basic system. The fundamental problem is providing such a processor as an optional add-on unit is that to be practical, it should perform as though it were natively attached to the CPU; which is to say, its operations should be synchronized with those of the CPU so that both processors may execute their respective instructions under a common timing control, but at the same time it should avoid imposing an undue hardware burden. On the other hand, it should not be degraded to the status of an ordinary input/output (I/O) device. If the outboard processor has to operate completely in the manner of an ordinary I/O device, which can communicate with the CPU only in the customary asynchronous "handshaking" mode, then its operation will be too inefficient to justify the additional cost of such a processor. An asynchronous interface established through a conventional I/O channel may serve adequately for effecting transfers of data between the outboard processor and main storage, but when control information is being communicated between the CPU and the outboard processor, a synchronous interface is needed for efficient and economical operation of the system.

SUMMARY OF THE INVENTION

A broad object of the present invention is to enable an externally attachable processor module to function substantially as though it were natively attached to the central processor insofar as the execution of instructions is concerned.

Another object is to provide an improved modular construction of a microprogrammed data processing system wherein a pair of processors which are not natively attached to each other can automatically establish a suitable interface for synchronizing their respective microcode-controlled operations whenever one processor is required to accept instructions or responses thereto from the other processor.

A further object is to enable an outboard processor to communicate with the central processor at least partially through a channel which it shares with conventional I/O devices that also are utilized by the central processor, without significantly degrading the performance of such devices.

In carrying out these objectives, a microprogrammed data processing system is arranged so that a central processing unit (CPU) may control at least one externally attachable processor module, such as a floating point processor in the present example, which communicates with the CPU partially through a conventional channel for I/O devices and partially through an auxiliary cable. (A plurality of outboard processors can tap into such a cable if it has additional branch parts giving it a Y configuration.) Upon the issuance of a microcoded instruction by the CPU calling for the performance of a floating point function, the microcode of the floating point processor becomes synchronized with that of the CPU, and both sets of microcode operate under common timing control for the duration of the specified floating point routine. While in this synchronized state, the CPU cannot be interrupted by an I/O device that wants to initiate a new transfer of data to or from main storage, but it still may continue to execute on a "cycle steal" basis, at predefined intervals, any transfer of data between itself and an I/O device that already was in progress at the time when the floating point processor was enabled. While the floating point processor is engaged in a processing function, the CPU may service cycle steal requests from I/O devices. At other times the CPU may enable data transfers from the floating point processor to main storage to be interleaved concurrently on a demand multiplex basis with data transfers from I/O devices to storage in response to cycle steal requests. While a cycle steal request is being serviced by the CPU, the floating point processor may be processing a selected floating point operation or it may be looping on its current microword to maintain itself in an alert status until such request has been satisfied by the CPU.

To recapitulate, the floating point processor or other outboard processor utilizes a normal asynchronous interface with the CPU for accomplishing routine data transfers between the processors, and it utilizes a special synchronous interface when control information is to be exchanged between the processors. While the synchronous interface is in effect, it will permit a limited degree of communication in cycle steal mode between the CPU and any I/O devices that share the channel with the outboard processor. This enables one or more outboard processors to be attached to a CPU in an economical fashion for expanding the data processing capability of a computer system without causing the performance of any component of that system to be adversely affected.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGS. 3A and 3B together show the portions of the central processing unit circuitry and interface structure therewith associated which are essential to an understanding of the invention.

FIGS. 4A and 4B together show the portions of the secondary processor circuitry and interface structure therewith associated which are essential to an understanding of the invention.

FIGS. 5A and 5B together constitute a timing diagram showing the relative sequence in which the two processors (CPU and FPP) execute their respective microinstructions while they are interfaced with each other during an exemplary operation of the system.

FIGS. 6A to 6G, when arranged as shown in FIG. 6, constitute a flowchart showing the functional interrelationships among the significant CPU and FPP microwords depicted in the timing diagram of FIGS. 5A and 5B.

FIGS. 7A and 7B, when arranged as shown in FIG. 7, provide a flowchart showing an alternative mode of operation which is followed in order to resolve a "race" condition that may occur under certain circumstances.

FIG. 8 is a timing diagram which is correlated with the flowchart of FIG. 7.

FIGS. 9A to 14 are timing diagrams depicting other floating point operations in which cycle stealing may occur at appropriate times during such an operation.

DETAILED DESCRIPTION OF A PREFERRED EMBODIMENT

Figure 1:
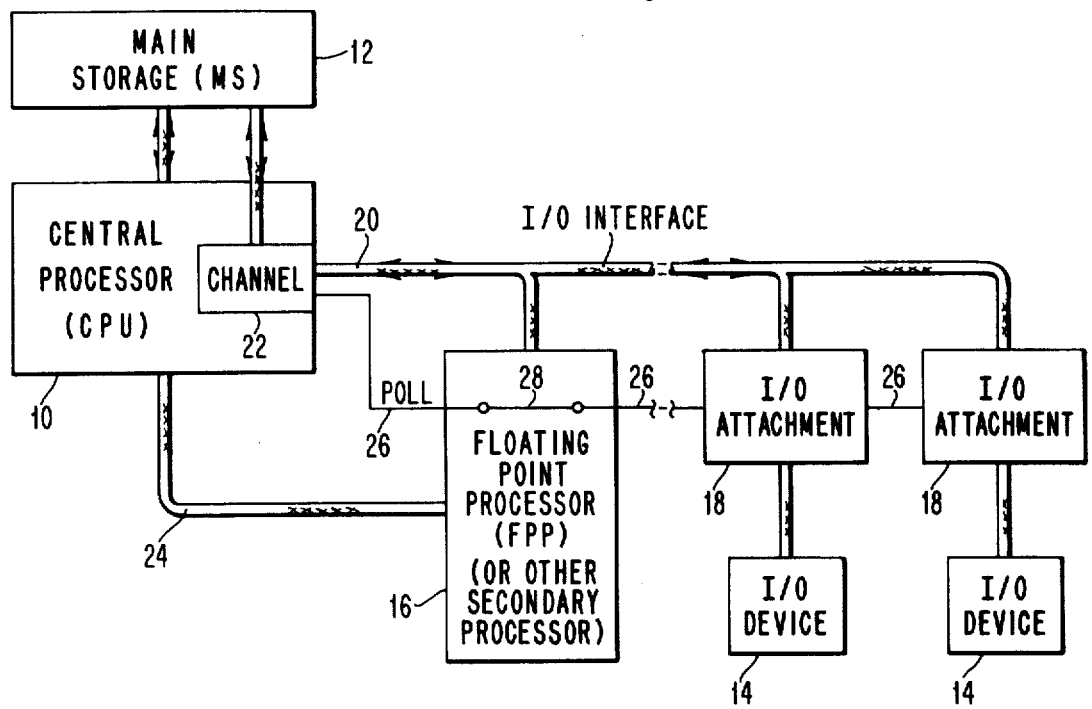
FIG. 1 is a general diagrammatic representation of a data processing system in which two microcoded processors are interfaced with each other and with a plurality of I/O devices in the manner taught by the invention, these two processors comprising in the present embodiment a central processing unit (CPU) and a floating point processor (FPP) which is representative of all secondary processors that may be interfaced with the CPU.
Figure 2:
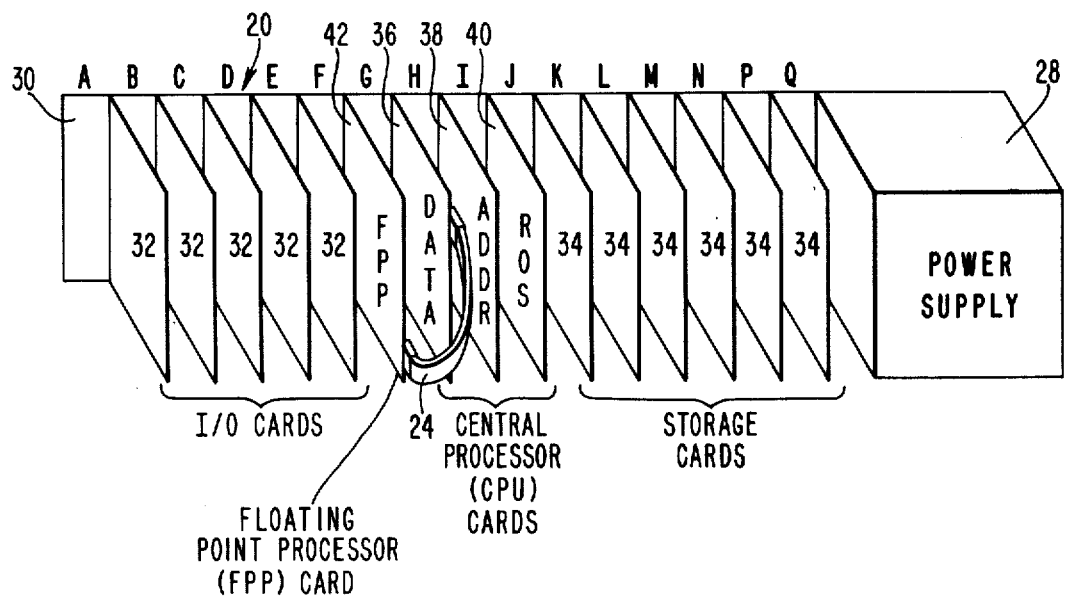
FIG. 2 is a simplified perspective view showing the physical configuration of the processor system.

FIGS. 1 and 2 respectively depict the general system design and the physical configuration of a representative microcoded data processing system in which the present invention may be utilized. Referring particularly to FIG. 1, a central processor 10 (also referred to herein as a "central processing unit" or "CPU") controls access to a main storage unit 12 and communicates with a number of peripheral units including conventional input/output (I/O) devices 14 and a secondary or "outboard" processor 16, which in the present embodiment is assumed to be a floating point processor (FPP). There may be a plurality of secondary processors of different kinds, but for the present purpose it will be assumed that only one such processor is included in the disclosed system.

Each I/O device 14 communicates with the CPU 10 and main storage unit 12 through a control unit or I/O attachment 18, an I/O interface 20 and a channel 22, which is the I/O control logic section of the CPU 10. The interface 20 comprises an assemblage of conductors arranged in various functional groupings such as a data bus, an address bus and I/O control lines, along with some additional lines or wires whose respective purposes will be explained presently. Communication between the secondary processor 16 and the CPU 10 is conducted partially through the I/O interface 20 and partially through an auxiliary cable or connector 24, which will be described more fully hereinafter. A poll line 26 (acutally a part of the interface 20 but here shown separately therefrom) is instrumental in certain types of I/O control actions (interrupts and cycle steals) to ascertain the identify of an I/O device that is endeavoring to communicate with the CPU 10. The poll line 26 connects the I/O attachments 18 in series with the CPU 10, and since it is not involved in the operation of the secondary processor 16, it is merely jumpered through this processor as indicated at 28, FIG. 1.

The various interactions between the CPU 10 and the I/O devices 14 under different operating conditions are described in the above-identified copending applications of M. A. Bouknecht et al, Ser. Nos. 681,983 and 682,229 U.S. Pat. Nos. 4,038,641 and 4,038,642) and will not be explained herein except to the extent necessary for understanding the present invention, which is concerned specifically with the interactions between the secondary processor 16 and the CPU 10 and the way in which this processor 16 shares the communication resources of the interface 20 and channel 22 with the I/O devices 14. From this point on in the present description, the secondary processor 16 will be referred to as the "FPP" or floating point processor, bearing in mind that this particular type of processor merely exemplifies the secondary processor or processors that may be included in a system embodying the invention.

FIG. 2 shows the physical arrangement of various structural members in the system of FIG. 1. These members include a power supply 28, a rack or board 30 extending therefrom, which supports the various conductors of the I/O interface 20 (FIG. 1), and a plurality of pluggable circuit cards 32–42 mounted upon the board 30. Giving further attention to these cards, the I/O cards 32, FIG. 2, respectively embody the circuits of the I/O attachments 18, FIG. 1. The storage cards 34 together constitute the main storage unit 12, the number of these cards varying in accordance with the memory size. The circuitry of the CPU 10 is embodied in three processor cards respectively designated the "data" card 36, the "address" (ADDR) card 38 and the "read only store" (ROS) card 40. The data card 36 performs all CPU arithmetic and logical operations (other than those specifically assigned to the secondary processor or processors) and provides the gating for data to and from the I/O interface 20 and the storage unit 12. The ADDR card 38 contains all the program-accessible hardware, such as data and status registers, and forms addresses used to access the storage unit 12 and the peripheral units 14 and 16. ROS card 40 contains the microcoded control store of the CPU and the means associated therewith for selectively addressing this store and reading microwords therefrom.

The circuitry of the secondary processor 16, in this case a floating point processor (FPP), is contained in a single card 42, FIG. 2. The auxiliary cable 24, FIG. 1, is provided by a top card connector 24, FIG. 2, which extends between the FPP card 42 and the CPU data card 36, into which it is plugged at its respective ends. The FPP card 42 is plugged into a position in the board or rack 30 which is adjacent to that of the CPU data card 36, replacing an I/O card that otherwise would occupy this position. It is not essential that the cards 36 and 42 occupy adjacent positions insofar as the principle of the invention is concerned, but this arrangement enables a standard short-length connector to be used as the auxiliary cable 24. If additional secondary processors are employed, their respective cards will be positioned in adjacent locations, and the interprocessor cable will have Y branches for extending the necessary connections to these other processors.

It should be noted at this point that the auxiliary cable 24 is employed because the standard I/O interface does not provide all of the interprocessor connections that are needed for practicing the invention.

As previously mentioned, the secondary processor 16 is assumed by way of example to be a floating point processor, but for the purpose of the present invention it could be a different type of secondary processor (or it could even represent a group of secondary processors). Hence, although the present description will be concerned in part with floating point number representation and the instruction set for a floating point processor, it should be kept in mind that the invention is not directed to a floating point processor as such but is concerned with a novel technique for enabling a pluggable type of secondary processor to share a normal I/O interface with a number of I/O devices without unduly restricting communication between the CPU and the I/O devices.

Specific references to floating point operations will be made herein only where they are necessary to an understanding of the example chosen for illustration, and the structure of the floating point processor will be described only to the extent necessary for explaining how this processor interfaces with the CPU.

Number Representation

Floating point numbers are represented in a fixed-length format which may have a length of two words (32 bits) for single-precision representation or a a length of four words (64 bits) for double-precision representation. In either format the first bit is the sign bit. The subsequent seven bit positions are occupied by the characteristic, which represents the exponent or power of the number expressed in "excess-64" notation. The fraction field of the floating point number contains either 24 or 56 bit positions and will accommodate either six hexadecimal digits for single-precision representation or 14 hexadecimal digits for double-precision representation.

Numbers stored in the main storage unit 12, FIG. 1, may be expressed alternatively in floating point representation or in signed binary integer representation. Numbers which are processed by the FPP 16 must be expressed in floating point representation. If a signed binary integer in main storage is to be used in a floating point operation, it must first be converted by the FPP 16 to a floating point number at the time when it is loaded into a floating point register. A floating point number held in a floating point register may be converted to a signed binary integer by the floating point processor. An operation of this kind will be described hereinafter as an example of the way in which the CPU-FPP interface functions.

Floating Point Instructions

The floating point instructions which are of particular interest in the present application are described below. These instructions have been selected for consideration herein because they are the ones which permit the channel 22, FIG. 1, to be switched between its interprocessor mode and its cycle steal mode in order that the I/O interface 20 will be equitably shared by the FPP 16 and the I/O devices 14. An important advantage of this invention is that it enables an outboard processor such as FPP 16 to function efficiently without monopolizing the interface 20 during the time while such a processor is in use. The special interface features that are described herein will enable channel switching to occur during certain floating point operations of relatively lengthy duration or frequent occurrence so that such operations do not cause the normal transfers of data between the I/O devices and the CPU to become unduly backlogged. In the case of other floating point instructions (not described herein) the duration or frequency of their operations are not such as to require channel switching. The floating point instructions that permit channel switching are as follows:

Floating Load Integer (FLI)

Floating Load Integer Double (FLID)

FLI is the single-precision form and FLID the double-precision form of this instruction. FLI causes a 16-bit signed binary integer in the main storage (MS) location specified by the effective address (EA), representing a one-word operand, to be converted into a 32-bit floating point number (with low order zeros inserted) and then loaded into the floating point register jointly specified by the R (register) field of the instruction and the current interrupt level. FLID converts a 32-bit signed binary integer representing a two-word operand into a 64-bit floating point number and loads the latter into the specified floating point register. In either of these operations, cycle stealing will be permitted during the interval while the number conversion is being accomplished.

Floating Store Double (FSTD)

In this operation the 64-bit (4 word) double-precision floating point number contained in the register specified by the R field of the instruction is stored in the main storage location specified by the effective address (EA).

Concurrent cycle steals may be interleaved on a demand multiplex basis with FP data transfers after the first pair of FP words has been transferred to storage and before the last FP word is transferred to storage.

Floating Store Integer (FSTI)

Floating Store Integer Double (FSTID)

These instructions cause a floating point number in the FP register specified by the R field of the instruction to be converted into a signed binary integer and stored at the main storage location specified by the effective address. FSTI converts a 32-bit single-precision FP number to a 16-bit integer (one word), FSTID converts a 64-bit double-precision FP number to a 32-bit integer (two words). In either case the instruction permits cycle stealing to occur during the time while the FPP is performing the conversion. In an extreme case, as many as 73 cycle steals could take place during this interval. FSTID also permits a concurrent cycle steal to be interleaved on a demand multiplex basis between the respective transfers of the first and second interger words to storage. An operation of this kind will be described in detail hereinafter as an example of the manner in which the novel CPU-FPP interface functions.

Storage-to-Register Operations

Floating Add, Substract, Multiply, Divide

(Single or Double Precision)

In each of these instructions the indicated arithmetic operation is performed with one operand in the main storage location indicated by the effective address and the other operand in the floating point register specified by the R field of the instruction. While the FPP is performing the required arithmetic operation, cycle steals may occur.

Register-to-Register Operations, Single or Double

(Floating Add Register, Floating Subtract Register,

Floating Multiple Register, Floating Divide Register,

Floating Move Register, Floating Compare Register)

The indicated register-to-register operation is performed by the FPP using the operands contaned in the floating registers specified by the R1 and R2 fields of the instruction, or by moving the operand from register 1 to register 2 in the case of the "Move" instruction. Cycle steals are permitted during the processing time of any R-to-R operation.

Floating Store Level Block (FSTLB)

The contents of the entire block of floating point registers (16 words) for the level specified by the R field are stored in the locations specified by the effective address in main storage. Concurrent cycle steals are interleaved on a demand multiplex basis between the time when the first floating point word is stored in the CPU and the time when the last FP word is stored.

CPU-FPP Interface Structure

In this section of the description attention will be given chiefly to the processor hardware which is involved in the interface between the CPU 10 and FPP 16. The term "hardware" is used in this context as a matter of convenience to distinguish the elements described below from the so-called "firmware" consisting of the microcoded instructions (i.e., microwords) contained in the control stores of the CPU and FPP. From a substantive viewpoint, however, there is no material distinction between hardware and firmware inasmuch as they jointly perform the same general function of establishing or controlling circuits in selective fashion according to the particular operations that are to be performed by the system. Firmware may be regarded as a changeable portion of the hardware.

In describing the CPU-FPP interface structure, reference will be made particularly to FIGS. 3A, 3B, 4A and 4B, which show relevant portions of the CPU 10 and FPP 16. The irregular lines on these drawings indicate that the parts of the processor structures shown therein have been broken away from other parts of said structures that are not essential to an understanding of the invention. The various busses and wires shown extending between the CPU ad FPP in FIGS. 3B and 4A, othe than those contained in the auxiliary cable 24, are included in the I/O interface 20 and are physically located on the board 30, FIG. 2. Following the description of the interface structure, an operational example will be described.

Figure 3B:
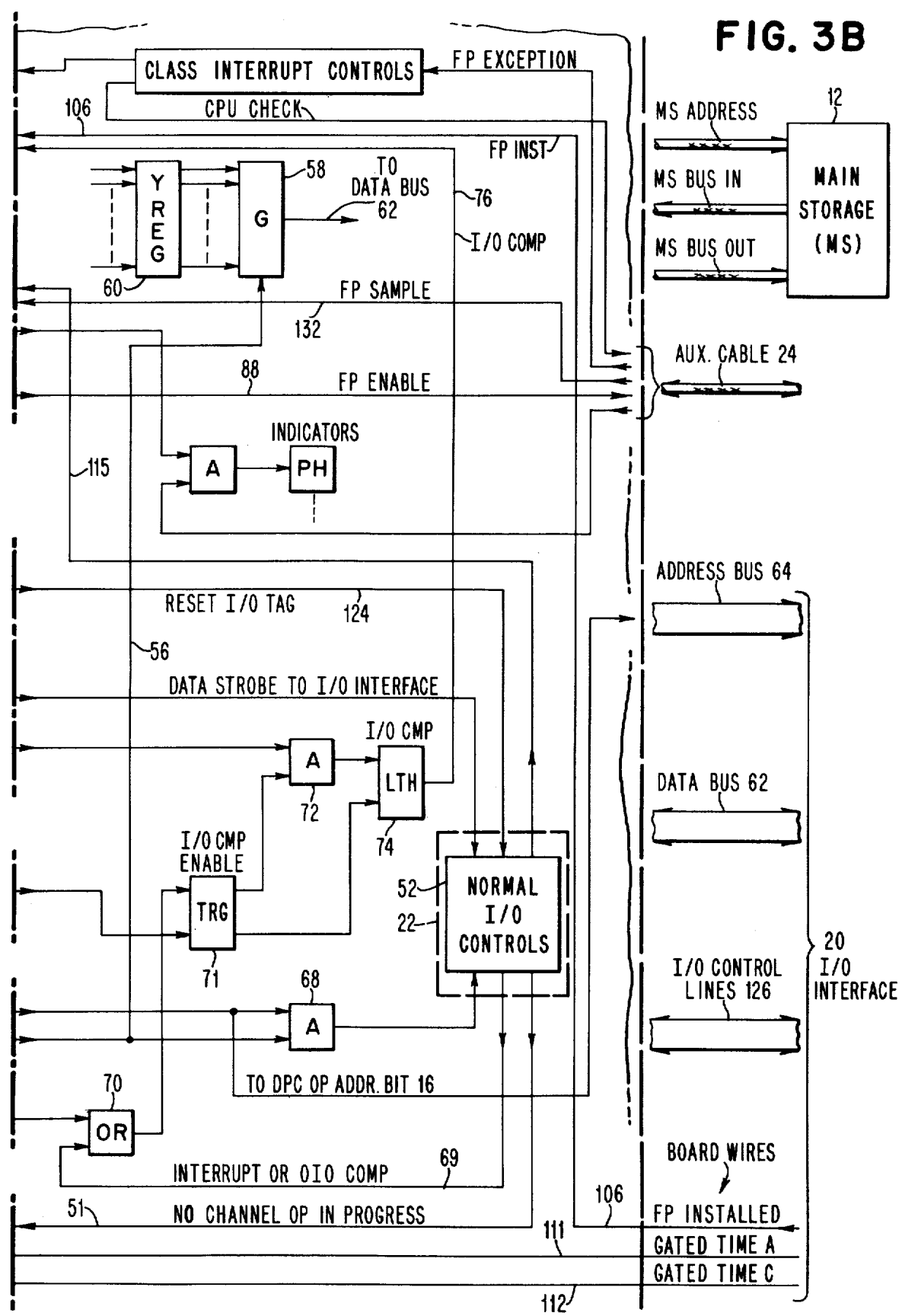
Figure 6C:
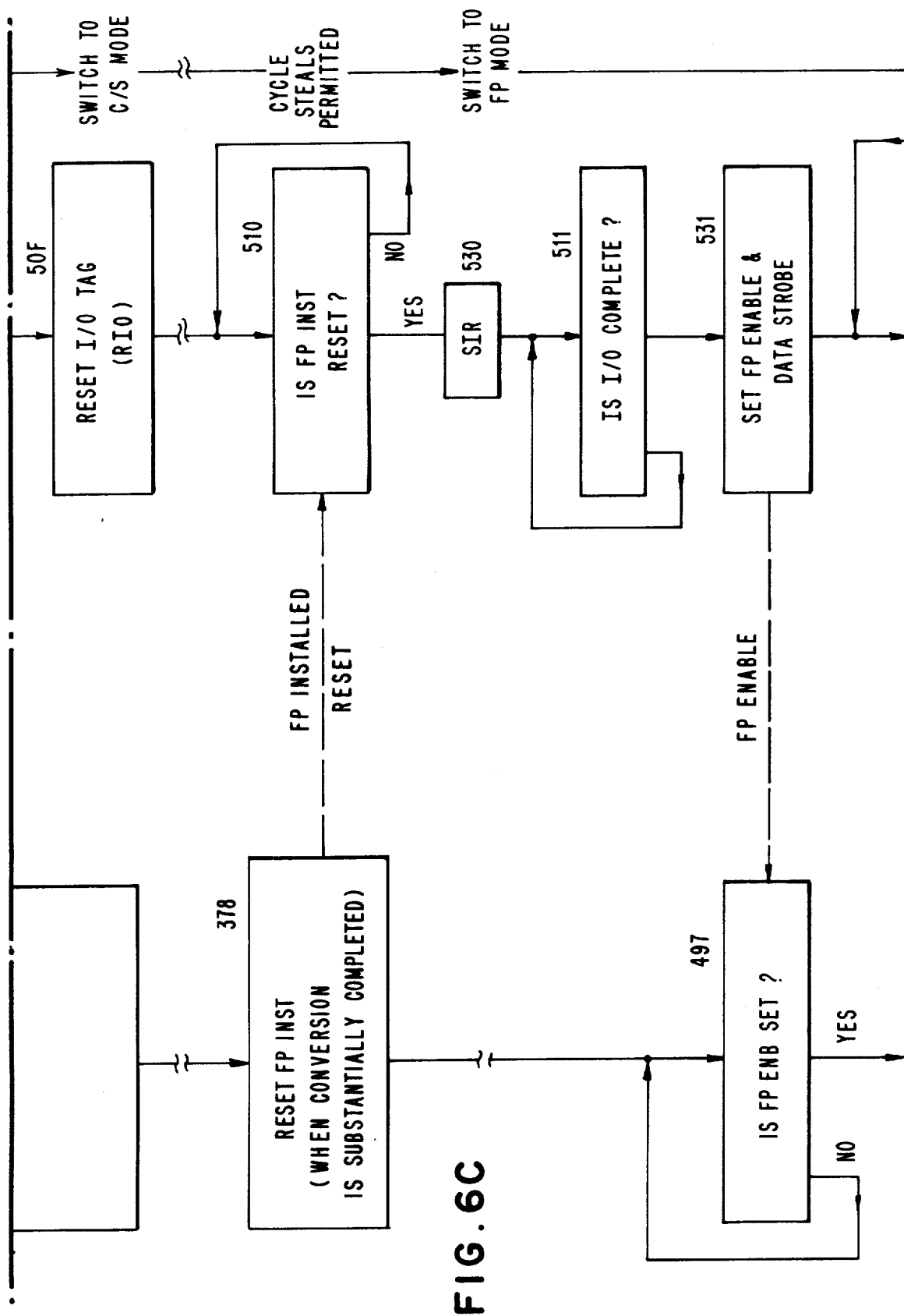
Figure 6D:
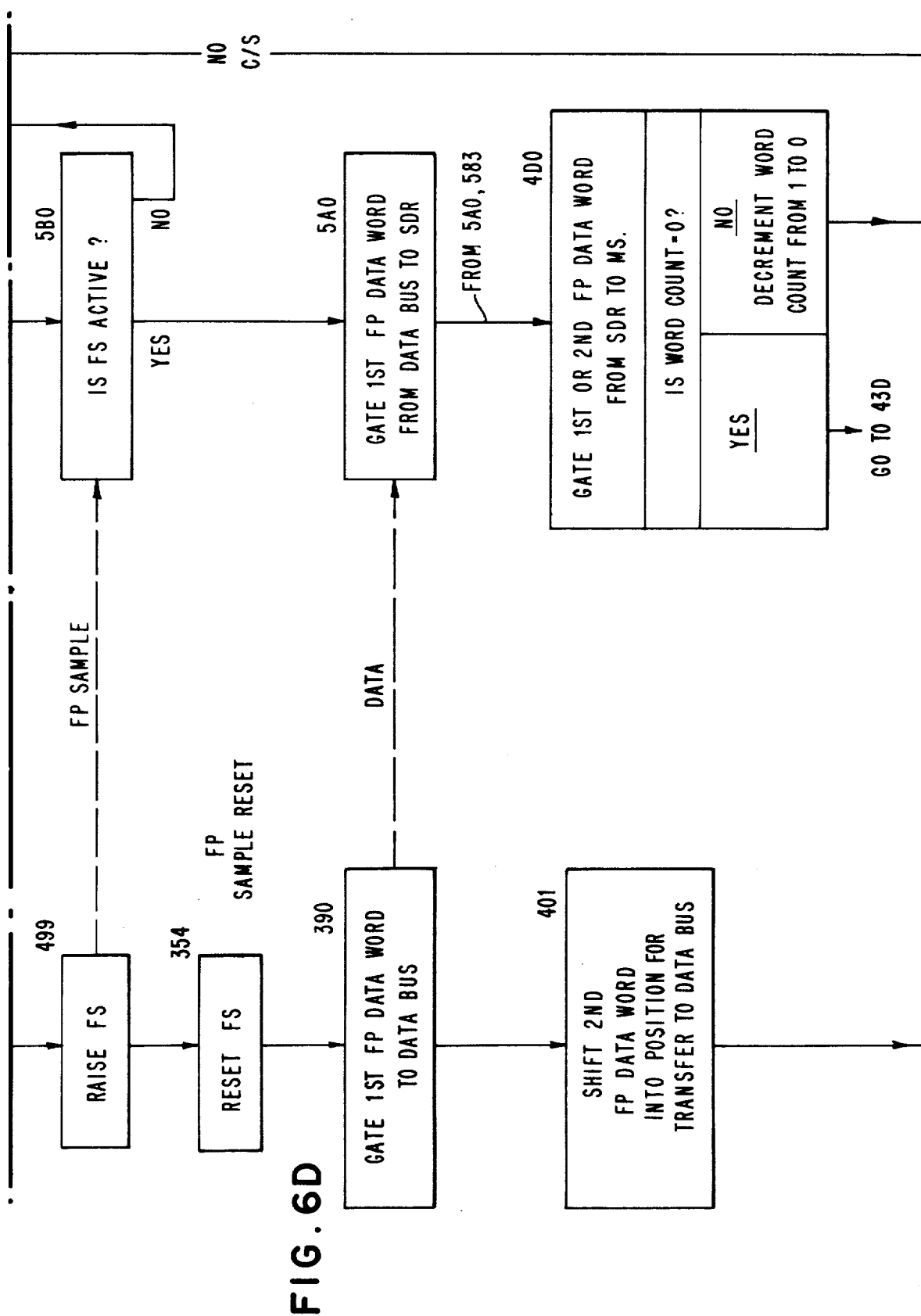

Referring now to FIGS. 3A and 3B, which partially represent the CPU 10, the establishment of an interface between the CPU 10 and the FPP 16 is initiated by addressing an appropriate interface-related microword in the read-only control store 44 of the CPU. At the appropriate clock time, the decoded output signal of ROS 44 passes through a gate 45 to set a latch 46, which thereupon places a "Set Interface Request" (SIR) signal on line 48 to denote that an interface between the CPU and the floating point processor 16 is desired. This SIR signal passes through an OR gate 49 to one input terminal of an AND gate 50. The AND gate 50 is conditioned to pass a signal only when there is no channel operation currently in progress. Assuming that no channel operation is now in progress, gate 50 receives an enabling signal over line 51 from the normal I/O control unit 52 (which is part of the channel structure 22, FIG. 1), thereby enabling gate 50 to pass the interface request signal for setting an "Immediate Sequence" latch 54. The setting of latch 54 applies a control signal on line 56 to the interface gate 58 between the Y Register 60 and the data bus 62 in the I/O interface 20, thereby enabling the CPU to pass information via register 60 to the data bus. This Y Register 60 is one of the data registers associated with the arithmetic and logical unit (ALU) of the CPU 10, not shown herein. It can furnish data to the ALU and also to the data bus when the interface is operative. As explained hereinafter, the current level of the CPU and the FPP address are placed upon the appropriate lines of the address bus 64 in the I/O interface 20 in response to source and destination information contained in the effective CPU microword (e.g., 49F, FIG. 6A).

Many of the CPU components such as the Y register, ALU and CPU counter mentioned above are not described in detail herein because they are standard units that have been employed for purposes not related to the present invention, and they furthermore are disclosed in the Davis and Bouknecht applications listed hereinabove. Reference can be made to these copending applications if more background information concerning such CPU components is desired.

The Immediate Sequence latch 54 also can be set by an "Operate I/O" (OIO) signal from the OIO latch 66, which is set whenever the CPU is to be interfaced with an I/O device for an immediate transfer of data between such device and the CPU. This type of operation is referred to as "direct program control" (DPC) to distinguish it from the other types of conventional I/O control that may be used for data transfer purposes (cycle steal and priority interrupt). The OIO latch 66 is set in response to the addressing of an appropriate microword in ROS 44, which when decoded furnishes a SIO (Start I/O) signal through an AND gate 67 (at the appropriate clock time) to set the latch 66. The output of latch 66 (OIO signal) is applied through the OR gate 49 and the AND gate 50 (assuming no channel operation is in progress) to the Immediate Sequence latch 54. The setting of latch 54 has the effect of gating the Y register 60 to the data bus 62 (the same as described above in connection with the setting of the CPU-FPP interface), and when an OIO operation is desired, it also has the effect of sending a signal through gate 68 to the I/O controls 52 for conditioning these controls to perform a DPC data transfer. For additional information on the DPC, cycle steal and interrupt modes of data transfer, reference may be had to the Davis and Bouknecht applications identified hereinabove.

The setting of the Immediate Sequence latch 54 in response to a Set Interface Request (SIR) signal has the additional effect of generating an "I/O Complete" signal of a type that normally would be generated when the operation of an I/O device terminates. Ordinarily when an I/O device has terminated its operation, the I/O controls 52 send a signal through line 69 and OR gate 70 to set a trigger 71, which at the appropriate clock time causes a signal to pass through the AND gate 72 for setting the "I/O Complete" latch 74. This places an I/O Complete signal on line 76 leading to the CPU microcode branch controls unit 78 for terminating any loop which these branch controls may be executing while awaiting an I/O Complete and advancing the address register of the ROS unit 44 to the next microword in the chosen sequence.

In the present instance, where a floating point sequence is involved, the I/O Complete signal should be generated as soon as the Immediate Sequence latch 54 is set in response to a Set Interface Request (SIR) signal. It will be recalled that latch 54 can be set only when there is no channel operation currently in progress. Accordingly, the setting of latch 54 in response to a SIR signal will cause an AND gate 80 to be enabled at the appropriate clock time for causing a signal from latch 54 to be passed through AND gate 80 and OR gate 70 to set the I/O Complete Enable trigger 71, which in turn sets the I/O Complete latch 74 for signalling the CPU microcode branch controls 78 to advance the control address to the next microword in the chosen sequence.

In a floating point routine the next significant step is to generate a "Floating Point Enable" signal. When a microword which is relevant to this action is decoded, a signal is sent through AND gate 84 (at the appropriate clock time) to set a Floating Point Enable (FP ENB) latch 86. This places a signal on a Floating Point Enable line 88, FIGS. 3A, 3B, 4A and 4B, which passes through the auxiliary cable 24 (FIGS. 1 and 2), thereby routing the FP ENB signal to the drivers and receivers of the FPP, collectively designated 89 in FIG. 4A, and also to a selection logic unit 90. The unit 90 is an AND function unit which responds to the FP ENB signal on line 88 when the FPP microcode address is in its home position and the FPP is being addressed on the address bus 64 to furnish signals for accomplishing the actions listed below:

1. Condition gate 94 to pass the FP OP code into the OP register 96.

2. Condition gate 98 to pass the current CPU interrupt level (or alternatively a level selected by the programmer in the case of certain privileged OP's) to a FP level register 100.

3. Cause the FPP microcode address and branch controls unit 92 to advance from its home position and select the first active FP microword in the FP control store 102 according to the chosen FP OP.

4. Set the "Floating Point Installed" (FP INST) latch 104, FIG. 4B, to raise a Floating Point Installed signal on line 106, which is one of several "board wires" that are formed by conductive lands on the interface board 30, FIG. 2.

Figure 4B:
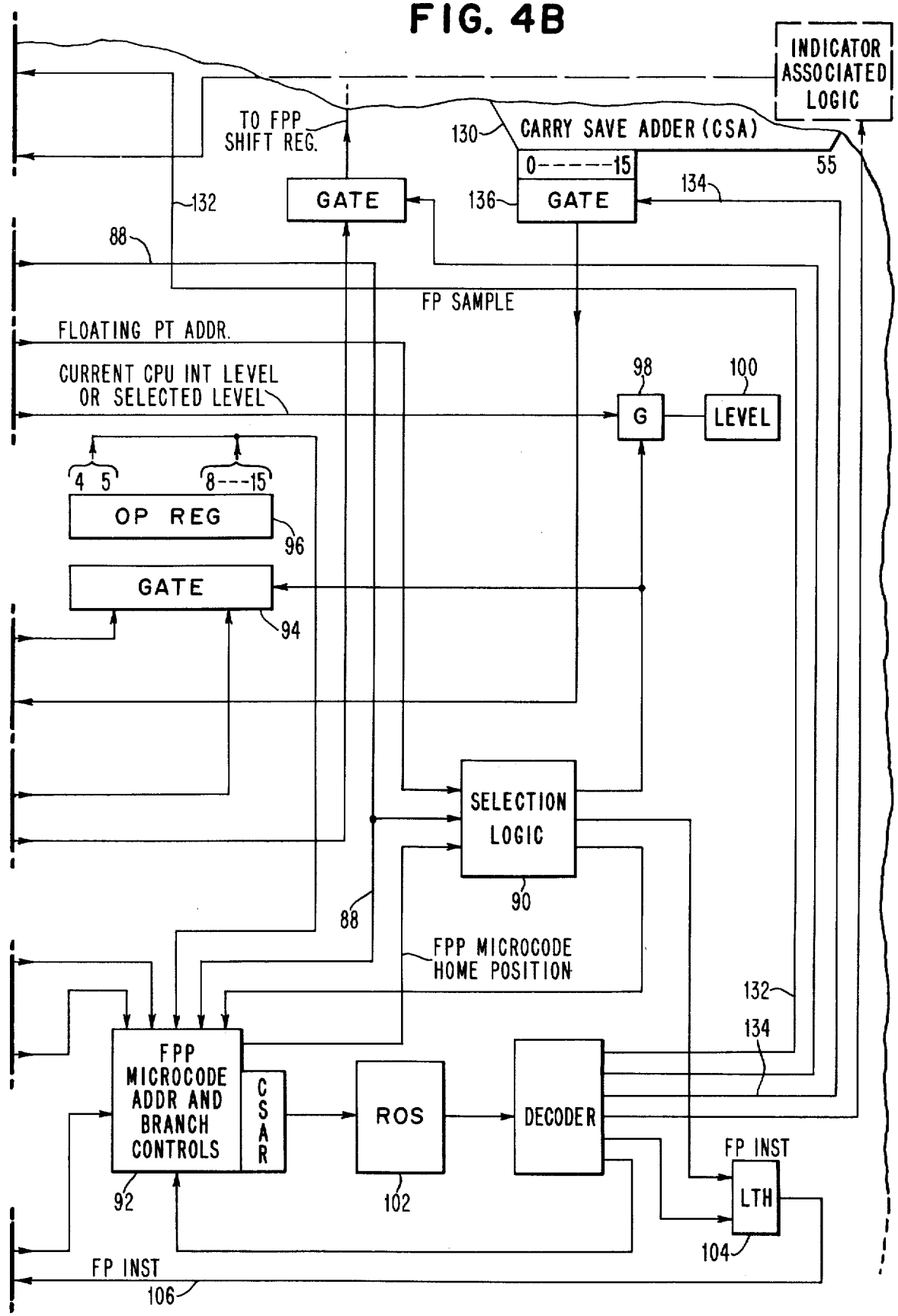

Thus, to recapitulate, the FP Enable signal conditions the FPP drivers and receivers 89, FIG. 4A, to pass information from the address bus 64 and to and from the data bus 62, and if the FPP is in its reset or home position, then FP Enable causes the FPP to examine the address bus for its address (assumed herein to be 0000). If such address is found, then units 90 and 92, FIGS. 4B and 4A, function to advance the FP microcode address to the first microword of the FP sequence chosen by the FP OP code, which meanwhile has been gated from the data bus 62 into the FP OP register 96. Finally, within one machine cycle, FP ENB raises the FP Installed signal to indicate that the floating point operation has been selected and is about to commence. The consequences of this action will be explained shortly.

The FPP slave clock unit 108, FIG. 4A, times the execution of the FP microcode under control of a gated time logic unit 110 in the CPU, FIG. 3A. As indicated in the drawing, cyclic timing pulses A, B, C and D are fed in sequence to the unit 110, which is gated under control of the CPU microcode to send certain ones of these timing pulses, namely, the gated A and C pulses, over the board wires 111 and 112 in the interface 20 to the slave clock unit 108 in the FPP. The same timing pulses A and C also are applied to the addressing and readout means of the CPU control store 44. Hence, when microcodes are being concurrently executed by the CPU and the FPP, the sequential utilization of microwords by the two processors will be under common timing control so that the microwords are addressed at the same rate in both processors. This is one aspect of synchronizing the operations of the two processors.

Another aspect of synchronization is to maintain logical coordination between the microcodes of the respective processors. There are certain microwords in the FPP microcode which should not be executed until certain CPU actions have occurred, and vice versa. This means that at certain times the CPU control store or the FPP control store, as the case may be, will have to pause or loop on its currently addressed microword until it receives a signal from the other processor indicating that it may now advance to the next microword in the chosen sequence. The generation of these microcode coordinating signals is the responsibility of the CPU-FPP interface apparatus, which is the subject of the present invention. Thus far, one such coordinating signal (FP Enable or FP ENB) has been described, and reference has been made to another (FP Installed or FP INST). These and other microcode coordinating signals will be given further attention herein as the description proceeds.

As mentioned above, when the current FPP microcode address is moved from its home position to commence the execution of a selected floating point OP, the FP INST latch 104, FIG. 4B, automatically is set to raise the Floating Point Installed signal on line 106, which extends to the microcode branch controls 78 in the CPU, FIG. 3A. This FP INST signal indicates that the FPP card 42, FIG. 2, is installed on the I/O interface board 30, and when active it permits the branch controls unit 78 to advance the CPU control store address to the next microword, which in this instance will cause the decoder of the control store (ROS) 44 to emit a signal for resetting a "T" latch 114. The T latch exerts a type of interlock control over the CPU microcode branch controls 78, and its resetting is a necessary condition for rendering the control unit 78 receptive to cycle steal (C/S) requests which may be sent to it over C/S line 115 by the I/O control unit 52, FIG. 3B. Such cycle steal requests cannot actually be sent over the C/S line, however, until the channel 22, FIGS. 1 and 3A, first is switched from its FP processor mode to its C/S mode. The manner in which this is accomplished will be described shortly.

Some floating point OP's require a substantial length of time to be processed by the FPP, and during this time the CPU is given an opportunity to service cycle steal requests that may be made within this processing period. If the currently selected OP is of this character, the related CPU microcode will contain a microword that in due course (following receipt of the FP INST signal and the resetting of the T latch 114) is decoded to furnish a timed signal pulse through the RGFP (Reset Floating Point Enable) gate 116 for resetting the FP ENB latch 86, thereby terminating the Floating Point Enable signal on line 88. This renders the FPP drivers and receivers 89 inactive, so that no information can pass into or out of the FPP by way of the I/O interface 20.

In due course, after FP Enable has been reset, a CPU microword is decoded by ROS 44 to provide a signal through the "Reset I/O Tag" (RIO) gate 118 to a line 120 connected with the reset terminals of the SIR latch 46, the OIO latch 66 and the I/O Complete Enable trigger 71, and this RIO signal also is sent through a line 124 to the normal I/O controls 52 in the channel 22, FIG. 3B. The resetting of SIR latch 46 causes the Immediate Sequence latch 54 to be reset, thereby causing the Y register 60 to be degated from the data bus 62. Application of the Reset I/O Tag pulse to I/O controls 52 now switches the channel 22 to its cycle steal (C/S) mode, enabling it to pass C/S requests from the I/O control lines 126 in the interface 20 through the C/S request line 115 to the CPU microcode branch controls 78, FIG. 3A.

In some of the floating point operations which involve the loading of data into the FPP, a pulsed Data Strobe (DS) signal is employed to indicate that data will be made available on the data bus 62 by the CPU a specific time after each DS pulse. Data Strobe is generated concurrently with the generation of the FP Enable signal by a Floating Point Data Strobe Polarity Hold (FPDS PH) 126, FIG. 3A, the output of which passes through an OR gate 128 to the I/O Controls 52 in channel 22. The normal channel Data Strobe (used in other than floating point operations) also is passed through OR gate 128 to the I/O Controls.

The Floating Point Processor 16, as it has been commercially embodied, utilizes a carry save adder (CSA) to perform all of its arithmetic functions. The CSA, fragmentarily represented at 130, FIG. 4B, is disclosed in the above-identified copending applications of G. P. Taylor et al, Ser. No. 792,078 (now U.S. Pat. No. 4,084,254) and Ser. No. 792,082. The present invention, however, is not concerned with the particular type of data processing unit employed in the secondary processor 16.

When the processing operation has been completed by the secondary processor 16 and the data resulting therefrom is ready for transfer to the CPU 10, the control store or ROS 102, FIG. 4B, of the secondary processor 16 addresses a microword which, when decoded, has the effect of placing a Floating Point Sample (FP Sample or FS) signal on a line 132, FIGS. 4A, 3B and 3A, that extends through the auxiliary cable 24 from the FPP 16 to the microcode branch controls 78 of the CPU 10. If this occurs at a time when the FP Enable signal (described above) is active, it indicates to the CPU that data will be made available on the data bus by the CPU a specific time later. If FP Sample occurs when FP Enable is not active (as it must do in all non-privileged operations), it signifies completion of the operation. These actions will be further described hereinafter.

Floating Point Exception and Floating Point Status Indicators (FIG. 4A), when they occur, will be carried by lines in the auxiliary cable 24 to the appropriate receiving elements in the CPU 10 (FIGS. 3A and 3B), which are not fully disclosed herein.

Examples of Operation

To illustrate the manner in which the disclosed system functions, there will be described below the principal events which occur during a typical Floating Store Integer Double (FSTID) operation. Two different situations will be considered in this connection. As a first case, it will be assumed that cycle steal (C/S) requests are being made continually throughout the floating point operation. As a second case, it will be assumed that an isolated or random cycle steal request arrives just prior to the time when the FPP has raised its FP Sample signal to indicate that it is ready to transfer the second word of a converted double-precision integer. (This is known as a "race condition.") A third example is where the C/S request arrives concurrently with FP Sample, and a fourth example is where no C/S request is received at any time while FP Sample is active.

The FSTID operation has been chosen for illustration herein because it involves both of the procedures which are available in the disclosed CPU-FPP interface for handling cycle steal requests while a floating point operation is in progress — first, permitting cycle steals to take place while the FPP is engaged in performing an algorithmic process required in the selected operation, during which time the FPP has no need to use the channel for data transfer purposes and the CPU has opportunity to service one or more C/S requests, and second, permitting one or more cycle steals to be interleaved or interspersed between successive transfers of data from the FPP to the CPU in certain instances as will be explained hereinafter.

Figure 5B:
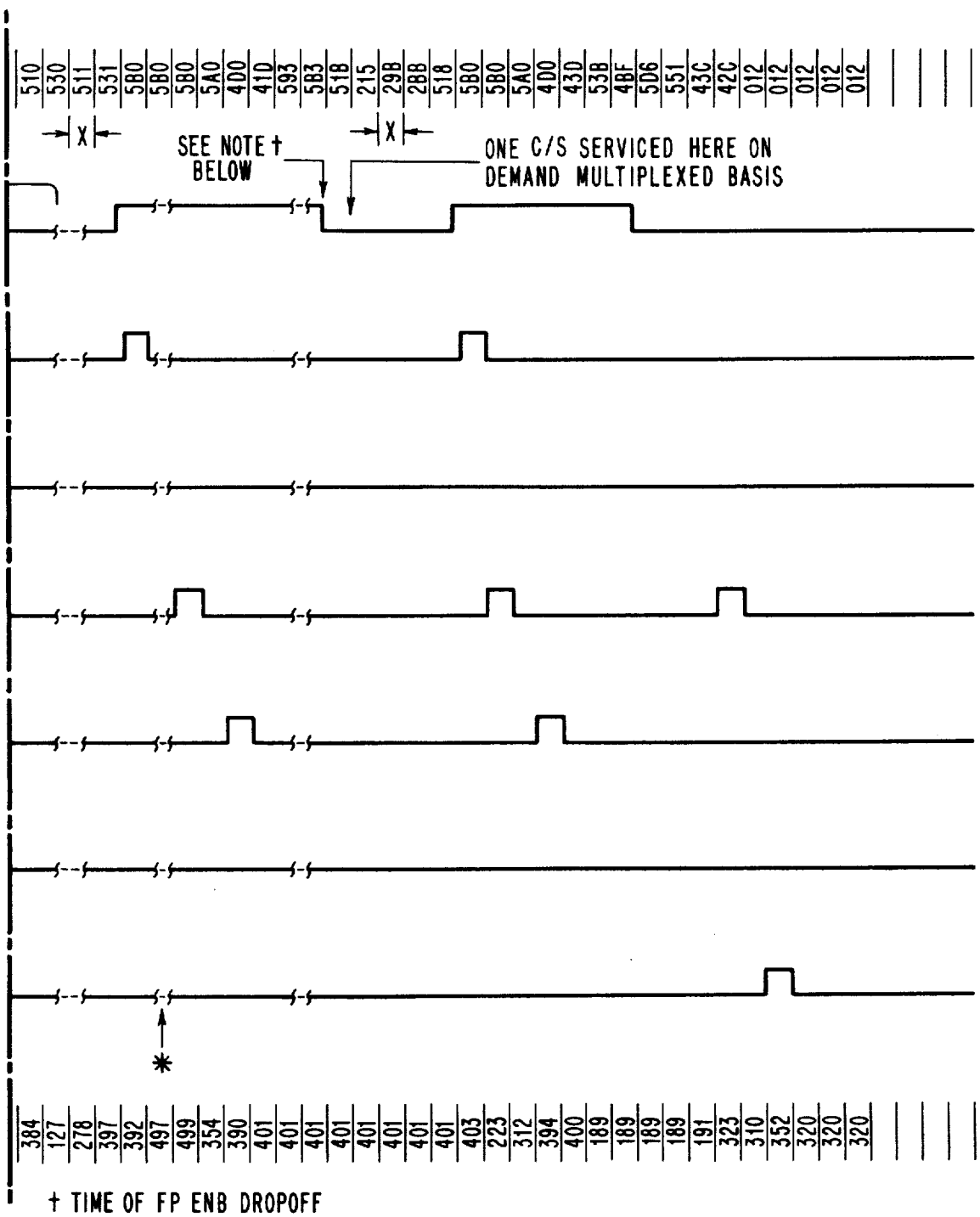

Reference now is made to the timing chart, FIGS. 5A and 5B, and to the related flowchart, FIGS. 6A to 6G, which together illustrate the significant interface-related actions which occur in the CPU 10 and FPP 16 when a Floating Store Integer Double (FSTID) operation is being performed by the FPP. In this operation a double-precision floating point number (which may be held in the FPP register as the result of a preceding operation performed by the FPP, or which may have been transferred there by the CPU from main storage) will be converted by the FPP to a corresponding signed binary integer (two words), which then will be transferred a word at a time from the FPP to main storage (MS) through the CPU storage data register (SDR).

In the timing chart, FIGS. 5A and 5B, the sequence of numbers in hexadecimal notation extending across the top edges of these figures are the respective control store addresses of certain CPU microwords which are involved in this examplary FSTID operation. Extending across the bottom edges of these figures is a sequence of numbers in decimal notation representing the respective control store addresses of FPP microwords which are involved in this operation. For convenience, individual microwords will be identified by their addresses in their respective control stores. Thus, for example, the hexadecimal expression "microword 49E" refers to the microword stored at address 49E in the CPU control store. Both sequences of microwords are laid out on the same time scale (progressing from left to right) and vertically aligned microwords in the two sequences occur simultaneously or nearly so. Between the two sets of microwords are graphs which represent the timing of various pulses, signals or voltage level variations which result from execution of the CPU and FPP microcodes, as will be described presently. Microword addresses used herein are exemplary.

In the flowchart, FIGS. 6A to 6G, many of the microwords referenced in FIGS. 5A and 5B are shown as flowchart boxes bearing appropriate legends, these boxes being identified by the respective CPU and FPP microword addresses. In this flowchart the timing relationships between the CPU and FPP microcodes are only approximately represented, the purpose of this chart being primarily to show how the two microcodes are coordinated and kept in synchronism with each other by the various coordinating signals that are passed through the CPU-FPP interface. The CPU and FPP operations are so coordinated as to permit cycle stealing to occur during intervals when the channel is switched to cycle stealing mode, as indicated along the right margin of the flowchart, and to inhibit cycle stealing when the channel is switched to FP processor mode.

Reference will be made to both the timing chart, FIGS. 5A and 5B, and the flowchart, FIGS. 6A et seq., in describing the FSTID operation. This operation will be described first on the assumption that cycle steal requests are being made continuously by the I/O devices and that the channel is available whenever the CPU tests for it. Then consideration will be given to other situations in which cycle steal requests are received sporadically or not at all by the CPU while the floating point operation is in progress.

A CPU-FPP interface is initiated by the CPU when it encounters an OP code calling for a floating point operation. In response to such an OP, the CPU branches to a portion of its microcode dedicated to the secondary processor, entering this sequence at the microword 440. At this time the FPP is looping on its home microword 320, waiting for a Floating Point Enable signal. The first pertinent event occurs at CPU microword 49F, which causes the CPU control store 44 (FIG. 3A) to emit a decoded signal for setting the SIR (Set Interface Request) latch 46 (FIG. 3A), and which also causes the CPU to place its current interrupt level and the address of the secondary processor (FPP address 0000) on the address bus 64. The next significant CPU microword is 3DF, which causes the CPU microcode to loop waiting for an I/O Complete signal. Since it has been assumed that the channel is available, the Immediate Sequence latch 54 (FIG. 3A) is set in response to the SIR signal, and this results in an I/O Complete signal being generated and sent to the CPU branch controls 78 (FIG. 3A) as described hereinabove. Microword 3DF also causes the floating point OP code to be placed on the data bus 62. The channel 22 is now in its FP mode, making the interface 20 available exclusively for the transfer of data between the CPU and the FPP. Meanwhile the FPP microcode is still looping on its home microword 320, awaiting FP Enable.

Having received an I/O Complete, the CPU microcode now advances to microword 3FF, which sets the FP ENB latch 86 and the FP Data Strobe polarity hold 124 (FIG. 3A). The FP Data Strobe is not used in the present FSTID operation, so it will be disregarded in the present description. The FP Enable signal goes via line 88 to the FPP drivers and receivers 89 and the FPP selection logic unit 90, FIGS. 4A and 4B, thereby placing the FPP on line with the CPU and conditioning it for operation. When logic unit 90 receives FP ENB, it examines the address bus bits 8-11 for the FPP address, and finding such address, it causes the FP Installed latch 104 to be set, gates the FP OP code from the data bus into the FP OP register 96, and selects the first active FPP control store address according to the OP, enabling the FPP microcode to move away from its home microword 320 to the first microword in the chosen FP OP sequence.

When the FP INST latch 104 was set, it placed on line 106 a FP Installed signal which is received by the CPU microcode branch controls 78, FIG. 3A. The CPU microcode meanwhile has advanced through a NOP (No Operation) microword 3CF to a microword 2CB, which checks to determine whether FP INST is now active and therefore determines whether the CPU may continue with its execution of the OP. This condition is met in the present case.

The FPP control store will advance its effective address to a FP microword selected according to the OP in progress and the value of the operands being operated upon. In this example the FP microword 104 (not related to the FP INST latch 104) now becomes active for initiating the algorithmic processes required for converting a given floating point number to its corresponding signed binary integer. Microword 104 actually is the beginning of a floating point routine involving a sequence of FP microwords.

Meanwhile the CPU microcode, having received the FP Installed signal at microword 2CB, thereupon advances to microword 29A, which resets the T latch 114, FIG. 3A, preparatory to switching the channel back to cycle steal mode. The CPU then advances through several microwords (not shown herein) to a microword 3DE, which sets the CPU counter to register a word count indicating the number of words that will be in the result data generated by the FPP. In the present case, where two integer words are to be produced by the FPP for representing a double-precision integer, the word count is set to 1 (one less than the actual number of words). If a single-precision integer were to be produced, the word count would be set to zero.

The next CPU microword 594 activates the RGFP gate 116, FIG. 3A, to reset the FP ENB latch 86, thus terminating the FP Enable signal and degating the FPP drivers and receivers 89, FIG. 4A, from the interface 20. The succeeding CPU microword 50F causes the RIO gate 118, FIG. 3A, to pass a signal for resetting the SIR latch 46 and switching the channel 22 to its cycle steal mode. The CPU now may service cycle steal requests from the I/O devices while the FPP is engaged in performing the floating-point-to-integer number conversion operation. The CPU microcode progresses to microword 510, where it will loop while awaiting the reset of the FP Installed signal that will signify completion of the FP conversion operation. It may be possible for the CPU to service many cycle steal requests during this interval. In an extreme example, where a floating point number C180 0000 0000 0000 is being converted to an integer, the CPU will loop 73 times on microword 510.

When the conversion operation is very nearly completed, the FPP routine advances to microword 378, which causes a reset of the FP INST latch 104, FIG. 4B, thereby dropping the FP Installed signal on line 106. This ends the loop on CPU microword 510, and the CPU now advances to its microword 530, which sets the SIR latch and thereby switches the channel back to its FP mode in preparation for the transfer of the first data word resulting from the FP operation back to the CPU and main storage. The next CPU microword 511 awaits for an I/O Complete, and since the channel is assumed to be available, the CPU microprogram advances to microword 531, which sets the FP ENB latch and FPDS polarity hold to raise the FP Enable and Data Strobe signals (the latter not being used in the present operation). The CPU then loops on its microword 5BO, waiting for FP Sample to become active.

The FPP microprogram meantime will advance along a microcode path dependent upon the operand to microword 497, which checks for FP Enable. Then, leaving sensed FP Enable, the FPP advances to microword 499, which will raise the voltage level of the FP Sample line 132 for the duration of one machine cycle. As mentioned above, this FP Sample (or FS) pulse gives a signal to the system that the FPP will be ready to transfer data to the CPU a specific time later, e.g., 3 machine cycles after FS is raised. Once FP Sample or FS is received by the CPU microcode branch controls unit 78, FIG. 3A, the CPU stops looping on its microword 5BO and proceeds to the next CPU microword 5AO.

In the meantime the FPP advances from its microword 499 to microword 354, which resets or terminates the FS pulse at the end of a machine cycle; thence FPP proceeds to its microword 390, which when decoded provides a signal over line 134, FIG. 4B, to the output gate 136 of carry save adder 130, thereby gating the first word of the floating point result data (in this case, the first word of a double-word integer) to the data bus 62. In anticipation of this, the CPU has advanced to its microword 5AO, which initiates action for gating the first FP data word from the data bus 62 to the CPU storage data register (SDR), not shown herein.

The FPP microcode now advances to microword 401, which causes the FPP to execute a series of operative steps for shifting the second FP data word into a position where it may be gated from the CSA 130 to the data bus. While these housekeeping functions are being performed, the FPP microcode loops on microword 401.

While the FPP is engaged in the data shifting process just described, the CPU operation advances to microword 4DO, which activates the necessary CPU controls for gating the FP data word currently in the SDR to the effective address in main storage. In this instance the SDR has been holding the first word of a two-word integer produced by the carry save adder 130 in the FPP. The second integer word, as mentioned above, is now being maneuvered by the FPP into position for transfer to the SDR, but this maneuver will require a number of machine cycles for its accomplishment.

As the first FP data word is being entered into main storage, CPU microword 4DO also checks the word count in the CPU counter. If the word count stands at 1, this denotes that one more FP data word eventually must be transferred to the CPU. In the present example it is assumed that the word count previously was set to 1 (microword 3DE). Therefore, the CPU microword 4DO effects a branch to the CPU microword 41D (a NOP) and at the same time decrements the word count by 1, reducing it to 0 in the present instance.

The CPU microcode now stands at microword 593, where a test is made to ascertain which one of the following four possible conditions exists:
1. Floating Point Sample (FS) active; no cycle steal (C/S) request being made.
2. Both C/S and FS currently active.
3. C/S request but no FS.
4. No C/S and no FS. (This condition causes the CPU to loop on microword 593.)

In the example presently under consideration it is assumed that cycle steal requests are continually being made by the I/O devices but that the FPP is engaged in its housekeeping attendant to shifting the second FP data word into position for transfer to the CPU. Hence, the CPU microcode now takes the branch designated "C/S; No FS" from microword 593, bringing it to microword 5B3. When decoded, microword 5B3 furnishes a signal for resetting the FP Enable latch 86, FIG. 3A. Removal of the FP Enable signal degates the FPP drivers and receivers 89 to inhibit or suspend any further transfer of data from the FPP to the CPU.

The CPU now reaches microword 51B, which effects a RIO (Reset I/O) action, switching the channel 22 to cycle steal mode, thus permitting one cycle steal request to be serviced by the CPU on a demand multiplexed basis. This C/S is interleaved between the time when CPU microword 51B becomes effective and the time when microword 29B allows resumption of the FP data transfer as I/O COMP is furnished. Although the intervening microword 215 set the SIR latch 46 (FIG. 3A), the switchback to FP mode actually does not become effective until there no longer is any channel OP in progress. This could take appreciable time if the active I/O device were at a great distance, delaying the completion of the cycle steal. The next significant CPU microword following I/O Complete is 518, which again brings up the FP Enable signal.

After completion of its housekeeping in connection with shifting the second FP data word into position for transfer, the FPP loops on its microword 403 until the FP Enable signal has been provided by the CPU as just described. Then it advances to microword 223, which activates FP Sample for one machine cycle, at the end of which FP Sample is terminated by microword 312. The CPU microcode meanwhile has advanced to microword 5BO, where it loops waiting for FP Sample to be raised. Upon sensing FP Sample, the CPU microcode advances to microword 5AO, which conditions the CPU to gate data from the data bus to the SDR. By this time the FPP microcode has advanced to its microword 394, which now gates the second FP data word to the data bus, after first testing to see whether FP Enable is still active (the purpose of this second FP ENB test being explained hereinafter). Thus, the CPU and FPP operations are so coordinated that the second FP data word (the second word of a double-precision integer in this case) now passes from the carry save adder of the FPP through the data bus to the storage data register of the CPU. The CPU operation now progresses to microword 4DO, which effects transfer of the second FP data word from the SDR to main storage. The FPP then enters another housekeeping phase of its microcode for ascertaining whether there are any FPP status indicators and preparing to transmit such indicators, if any, to the CPU.

After entering the final FP data word into storage at microword 4DO, the CPU again checks the FP word count, and finding it to be zero in this instance, the CPU now takes a microcode branch through the NOP microwords 43D and 53B to microword 4BF, which resets FP Enable. Then the CPU proceeds to microword 551, which effects an RIO for restoring the channel to cycle steal mode. The channel now stays in cycle steal mode, because any information which remains to be transferred from the FPP to the CPU (namely, the FP status indicators, if any) will be routed through the auxiliary cable 24, not through the I/O interface 20 and channel 22. The transfer of these indicators now will be described.

When the CPU microcode reaches the microword 43C, it loops on this microword awaiting the final manifestation of the FP Sample signal. When FP Sample is raised at FP microword 191, this signals the end of the floating point operation and alerts the CPU to receive FP indicators, if any. At FP microword 310 these indicators are gated to the auxiliary cable, and meanwhile the CPU has advanced to its microword 42C, which enables the CPU to receive these indicators. The FP microcode returns to its home microword 320, and the CPU microcode ends its FP sequence and returns to a basic position.

In reviewing the events described above with reference to the flowchart, FIGS. 6A to 6G, it will be noted that the CPU and FPP microcodes maintain themselves in synchronism through the agency of various coordinating signals that pass between them at strategic points in their respective operations, these coordinating signals comprising FP Enable, FP Installed, FP Sample, and in some FP operations (other than the one described above) FP Data Strobe. This microcode coordinating feature makes it feasible to operate the floating point processor or other secondary processor as a unit physically separate from the CPU, but functionally synchronized with it as though the two processors were natively attached to each other, without reducing the secondary processor to the status of an ordinary I/O device that must function entirely in an asynchronous "handshaking" mode with respect to the CPU.

Attention now will be given once again to the microword 593, FIG. 6E, in the CPU microcode, which becomes active just after the first FP data word has been transferred to the CPU in a floating store integer double operation. As mentioned above, if no FP Sample (FS) signal is active and no cycle steal (C/S) request is outstanding at this time, the CPU loops on microword 593 waiting for FS or C/S to become active. In the example described above it was assumed that C/S requests were continually being made and that FS was not active at this instant. This gave the pending C/S request an opportunity to effect a branch of the CPU microcode from microword 593 to microword 5B3, thereby resetting FP Enable, before the FPP microcode reached its microword 403 to test for FP Enable being active as a condition precedent to raising FS for transfer of the second FP data word to storage. Under these circumstances, the CPU would proceed to honor the current C/S request, and the FPP would merely loop on its microword 403 until this C/S request had been satisfied by the CPU, after which the FP Enable signal would be generated to permit FS to become active.

Figure 7B:
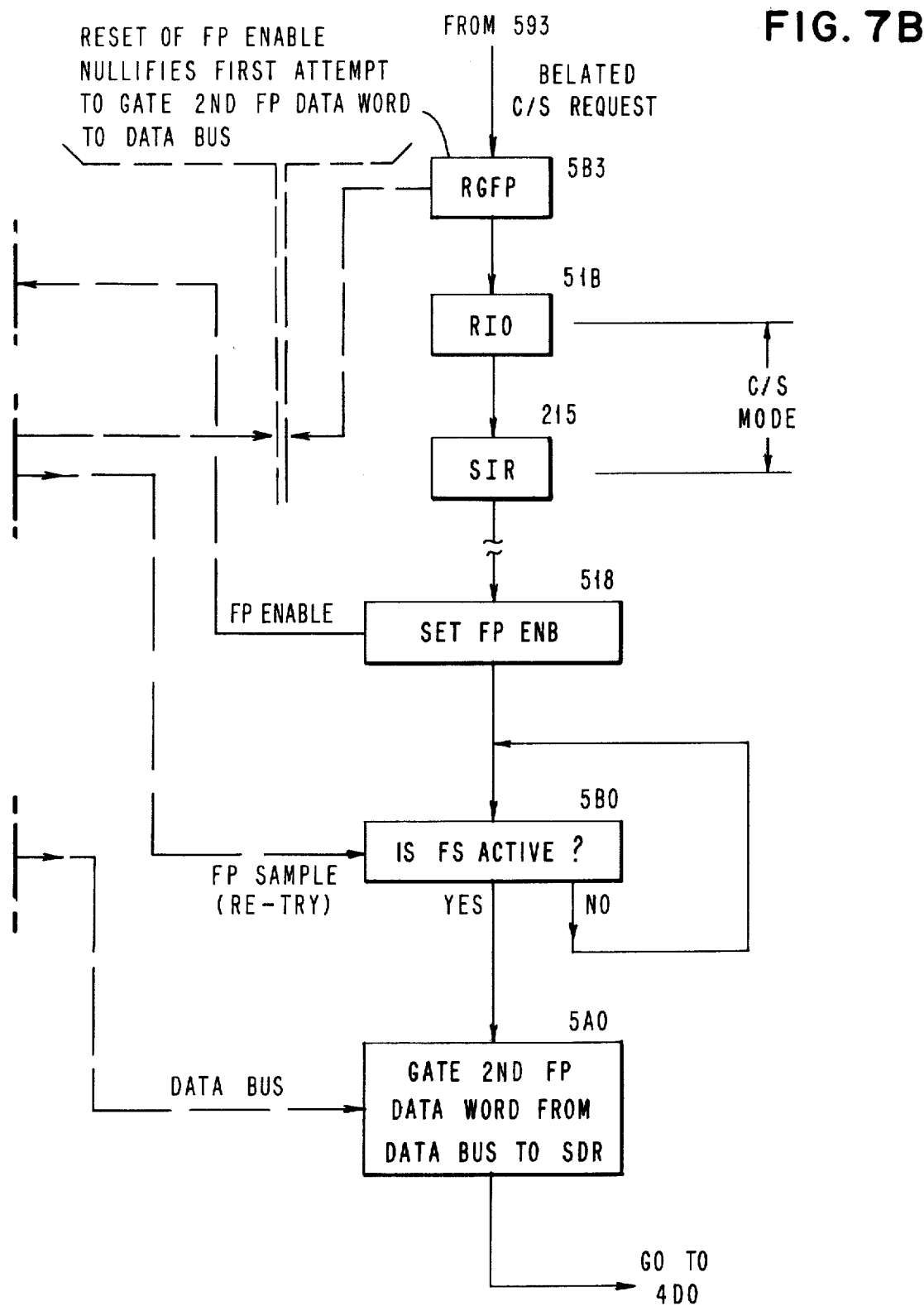

If C/S requests are made at random rather than continuously, it may happen that occasionally a C/S request comes into the CPU just at the time when the FP microword 403 is making a test to determine whether FP Enable is active. Under these circumstances, microword 403 finds FP ENB still active at this instant, because FP ENB was set previously by CPU microword 531 at a time prior to transfer of the first FP data word to storage. There now develops a "race condition" as illustrated in FIGS. 7A and 7B. The FPP microcode advances to microword 223 for raising FS, but meanwhile (in response to the C/S request) the CPU microcode branches from microword 593 to microword 5B3, which resets FP Enable at the exact instant when the FP microword 223 raises FS. This renders FS ineffective, because the dropping of FP Enable degates the FPP drivers and receivers from the data bus, thereby preventing the transfer of the second FP data word to the CPU.

The procedure shown in the modified flowchart, FIGS. 7A and 7B, and the related timing chart, FIG. 8, resolves this race condition by first permitting the CPU to honor the current cycle steal request and then instituting a re-try of FP Sample by the FPP, after FP Enable has become active again. Thus, referring to FIG. 7A, a test for FP Enable is made at FPP microword 394, and if it is found that FP Enable now is inactive after previously being found active by microword 403, the FPP operation thereupon branches to a special microword 445, which routes it to a microword 221 having the same function as microword 403, namely, to keep testing continuously for FP Enable until that signal again becomes active. FP Enable will be raised again in this instance after the I/O data has been transferred to storage by the CPU in response to the current cycle steal request. Thus, at CPU microword 518, FP Enable is set again, and now the FPP microcode branches from microword 221 to microword 223, which again raises FS for a new try at transferring the second FP data word to storage. This time the attempt is successful. FP microword 394 and CPU microword 5AO together effect transfer of the FP data word from FPP to SDR, from which it is entered into MS by CPU microword 4DO.

Figure 6E:
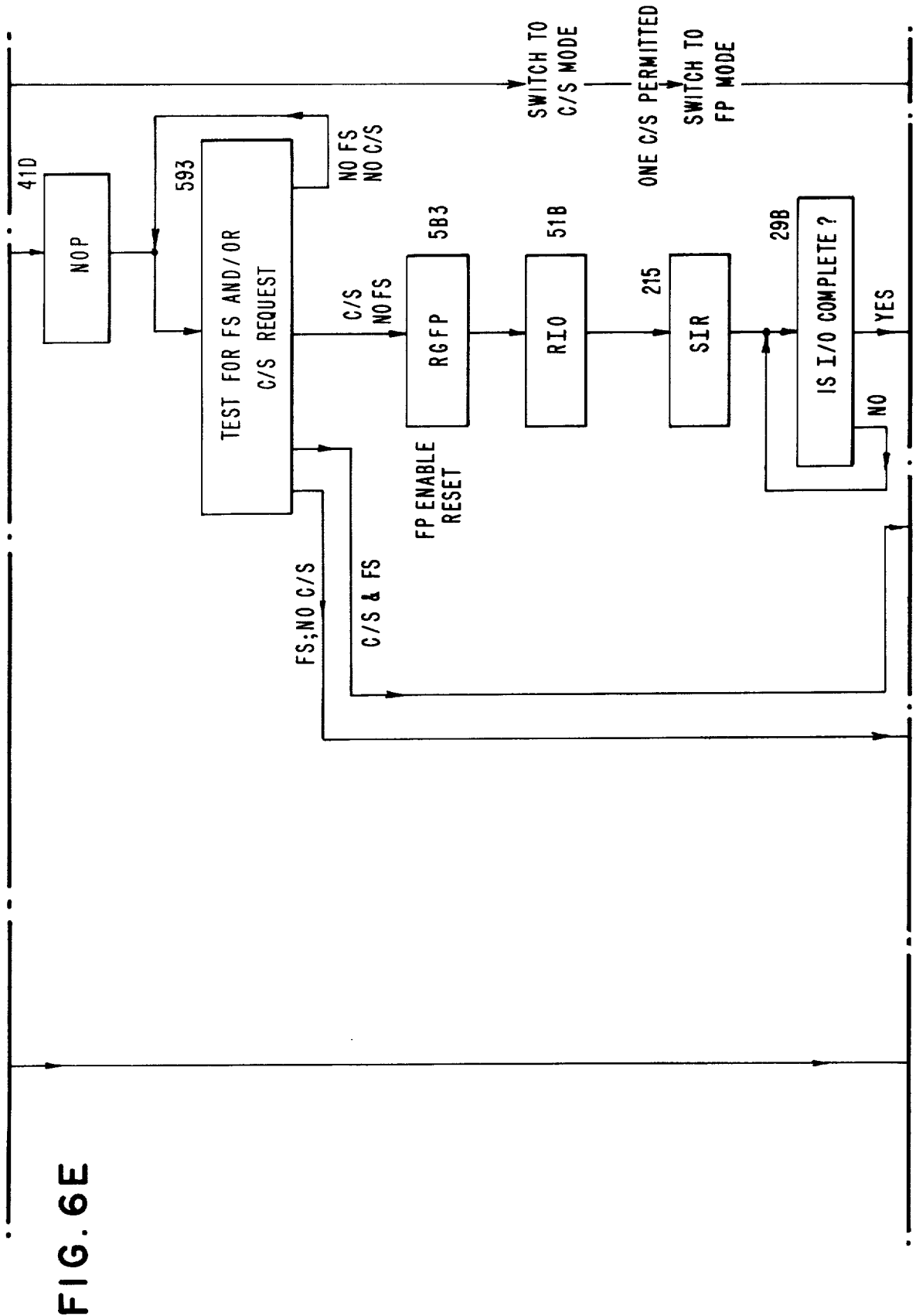

Other conditions which may arise during the critical period when CPU microword 593, FIG. 6E, is making its tests for FS and C/S wil now be considered. If no C/S request is outstanding at the time when the second FP data word is to be transferred to storage in a FSTID operation, then the FPP microcode proceeds along the branch from microword 593 to microword 583, FIG. 6F, which performs the same function as microword 5AO, gating the FP data word to the storage data register (SDR) of the CPU.

Figure 6F:
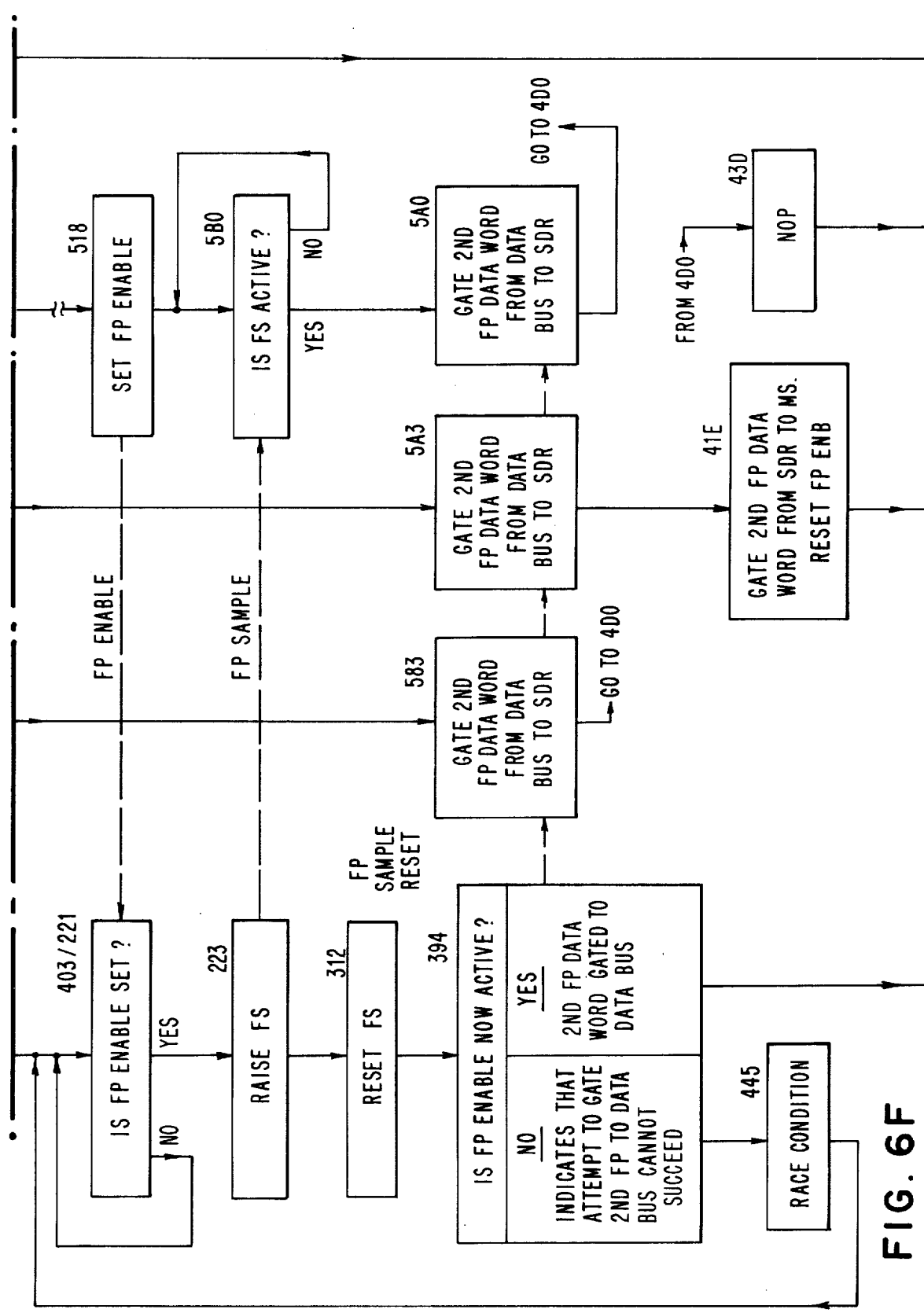
Figure 6G:
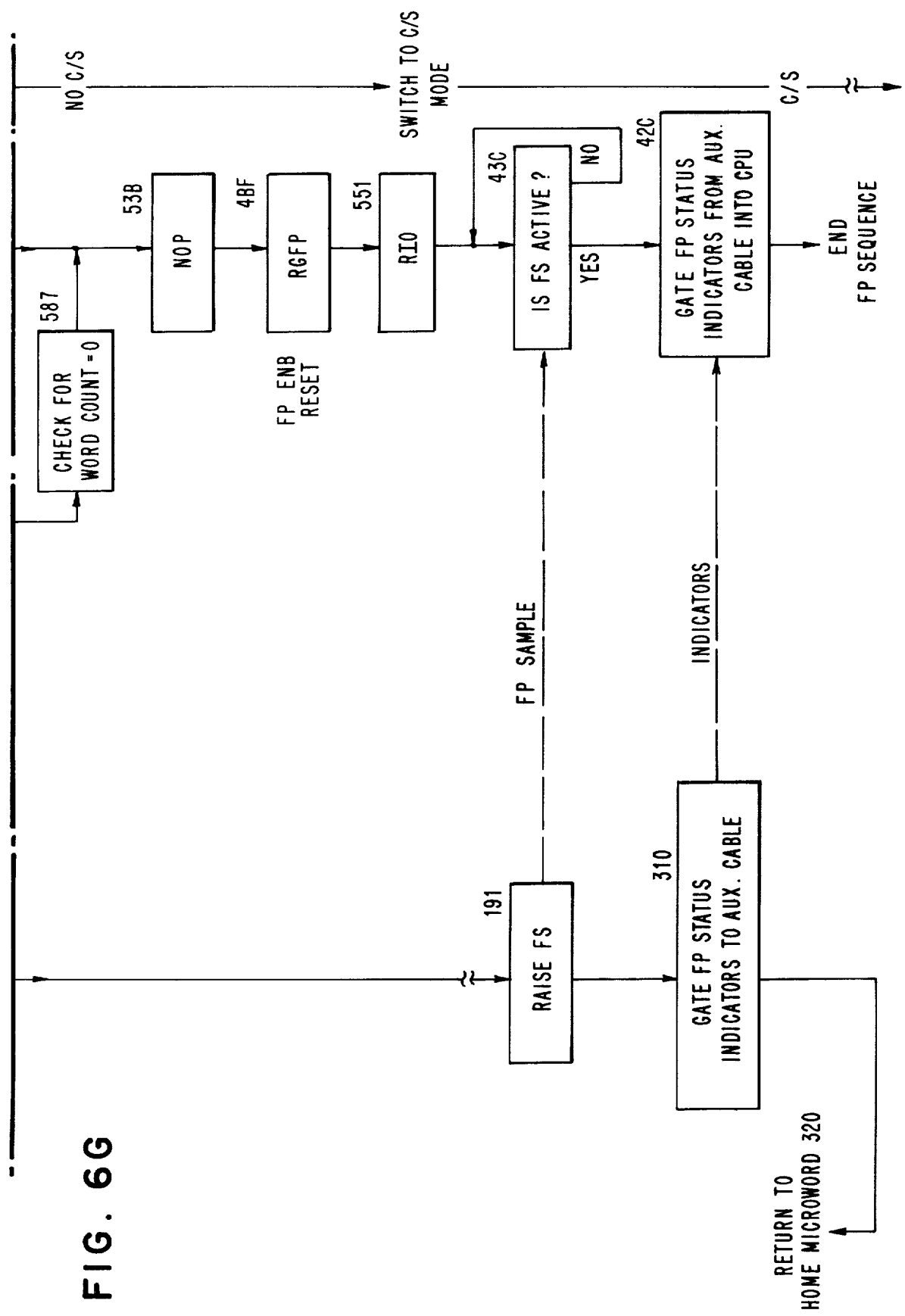

If an isolated C/S request is received by the CPU at exactly the same time that the FPP sends an FS signal to the CPU, the CPU microcode proceeds along the branch from microword 593 to microword 5A3, FIG. 6F, which performs the same function as microword 5A0 or 583, gating the second FP data word to SDR. Microword 41E then enters this data word into storage and resets FP Enable. Microword 587 checks to make certain that the FP data word count is now zero, then returns the CPU operation to the microword sequence 53B-4BF-551 for switching the channel back to its cycle steal mode. Thus, if a cycle steal request coincides with an FP Sample signal, the FP Sample is given priority over the cycle steal request.

Timing Charts of Other FP Operations

The description of operation presented hereinabove has dealt exclusively with the Floating Store Integer Double (FSTID) operation, which exemplifies two different types of channel sharing, one of which permits cycle steals to occur freely during FP processing time, and the other of which causes cycle steals to be interleaved with FP data word transfers over the I/O interface. Other FP operations which permit cycle stealing to occur under one or the other, or both, of these conditions will now be described briefly with reference to the timing charts for these operations, FIGS. 9A to 14. It should be kept in mind that these charts do not represent all of the floating point operations but only those for which cycle stealing may be permitted. The other FP operations are not discussed herein since they are not germane to the present invention.

In each of the timing charts referred to below, an asterisk (*) denotes intervals whose durations depend upon the operands involved. An "X" denotes intervals whose durations depend upon the time required for I/O Complete. Continuous C/S requests are assumed, and the channel is assumed to be available when needed. Microword numbers are not shown on these charts.

FIGS. 9A and 9B respectively depict the timing charts for Floating Load Integer (FLI), single-precision, and Floating Load Integer Double (FLID). In either of these operations cycle stealing can occur while the conversion from integer to floating point number is being performed by the FPP, starting two machine cycles after FP Enable is reset.

FIG. 10 shows the timing for a Floating Store Double (FSTD) operation, which permits one cycle steal to be interleaved on a demand multiplexed basis between the first pair of FP data words and the last FP data word being transferred to storage.

There has been described hereinabove with reference to FIGS. 5A and 5B a Floating Store Integer Double (FSTID) operation which permits cycle stealing to occur during FP processing time and also between the successive transfers to storage of the two FP data words produced by the FP process. Illustrated in FIG. 11 is a Floating Store Integer (FSTI) single-precision operation which permits cycle stealing to occur during FP processing time (after FP Enable has dropped) but not while the resulting FP data is being transferred from the FPP to storage.

FIGS. 12A and 12B respectively are the timing charts for all single-precision and double-precision floating point arithmetic operations in which one of the operands is passed from main storage to take part in the arithmetic process (add, subtract, multiply or divide). Cycle steals may occur during the processing time, which starts two machine cycles after FP ENB is reset. No transfers of FP data from FPP to storage occur during these operations.

FIG. 13 shows the timing chart for floating point register-to-register operations in which all operands are held in floating point registers prior to performance of the process (Floating Add Register, Floating Subtract Register, Floating Multiply Register, Floating Divide Register, Floating Move Register, Floating Compare Register). Cycle steals take place during processing time, which starts two machine cycles after FP ENB is reset.

FIG. 14 depicts a Floating Store Level Block (FSTLB) operation wherein the contents of an entire block of floating point registers at the level selected by the programmer are transferred to main storage. Cycle steals are interleaved on a demand multiplexed basis during periods when the FPP is engaged in shifting FP data words into position for transfer to the data bus, during which times FP Enable is down.

The foregoing description has pointed out the advantages of the invention as applied to a data processing system wherein a microcoded secondary processor that is physically separate from a microcoded central processing unit is able to function as though it were natively attached to the CPU for synchronization of their respective microcodes and is also able to share a conventional asynchronous channel with I/O devices for the purpose of transferring data to and from the CPU on an equitable channel mode switching basis. All of this is achieved with only a modest increase in the amount of interface hardware required.

Coordinating lines such as Floating Point Enable, Floating Point Installed and Floating Point Sample play an important role in the microcode synchronization procedure. Each of these lines may serve different purposes at different times. In this way the number of coordinating lines is kept at a small number to minimize the amount of interface structure needed. Thus, for instance, the Floating Point Enable (FP ENB) line 88, FIGS. 3A, 3B, 4A, and 4B, carries the FP ENB signal, which gates the FPP drivers and receivers to the common I/O interface 20. During its first rise this FP ENB signal enables the CPU to give command information to the Floating Point Processor (FPP). The subsequent fall of this signal is an event which shortly thereafter causes the I/O interface to be switched to its cycle steal mode for enabling cycle steal requests from I/O devices to be serviced on either a demand basis or a demand multiplexed basis, depending upon the type of operation. Any subsequent rises and falls of FP ENB in this same operation will switch the interface alternately to its floating point mode and cycle steal mode, respectively. The Floating Point Sample (FS) signal on the FS line 132, if it occurs while FP ENB is active, signifies that floating point data will be available for transfer at a specific later time from the FPP to the CPU. If the FS signal occurs while FP ENB is inactive, however, it signifies that the FPP has completed its operation altogether. The FP Installed signal on line 106 denotes by its rising that the FPP card 42, FIG. 2, is installed on the interface board 30 and that therefore the FPP will respond to the CPU's command. In a Floating Store Integer operation (double or single) the FP INST signal serves the additional purposes of indicating by its fall that the interface should be switched back to floating point mode for transferring the converted integer data from the FPP to storage.

Modifications and improvements of the disclosed system which are apparent to those skilled in the art can be made therein without departing from the scope and spirit of the invention as expressed in the following claims.

What is claimed is:

1. In a data processing system which has a central processor associated with a plurality of peripheral units including a secondary processor and one or more input/output devices, each of said processors having a microcoded control store and associated addressing means for selecting microwords from said store in a sequence determined at least in part by the operation to be performed, and wherein each of said peripheral units may communicate with said central processor through an interface at least part of which is common to all peripheral units in the system, the interface between said central processor and said secondary processor further including improved features whereby said processors can be synchronously coupled to each other for the joint execution of interrelated procedures and whereby said secondary processor also is able to share the common portion of said interface with the other peripheral units for transferring data to and from said central processor, said improved features comprising:

common timing control means for clocking the respective sequences in which stored microwords are utilized by both of said processors when they are operating conjointly, a first signal line extending between said processors, first control means in said central processor operable to place an enabling signal upon said first signal line when communication is to be established between said processors, a second signal line extending between said processors, second control means in said secondary processor responsive to an enabling signal on said first signal line when an operation specified by said central processor is being delegated to said secondary processor for placing on said second signal line a signal denoting that said secondary processor is installed and able to execute said operation, third control means in said central processor responsive to the operation-installed signal on said second signal line for conditioning said common interface to function in a cycle steal mode for transferring data between any of said input/output devices and said central processor while said secondary processor is performing the operation delegated to it by said central processor, and fourth control means in said central processor responsive to termination of the operation-installed signal on said second signal line when said secondary processor has substantially completed its performance of the selected operation for conditioning said common interface to function in an interprocessor mode permitting data transfer between said secondary processor and said central processor.

2. The apparatus of claim 1 which further comprises multiplexing means effective when said common interface has been conditioned by said fourth control means to function in an interprocessor mode as aforesaid for thereafter causing said common interface to function alternately for limited times in its interprocessor mode and its cycle steal mode, thereby enabling data transfers to be made concurrently on a demand multiplexed basis between said secondary processor or an active input/output device and said central processor so long as both said secondary processor and any of said input/output devices concurrently have data to be transferred to said central processor, wherein said multiplexing means includes the following:

a third signal line extending between said processors, fifth control means in said secondary processor effective after said fourth control means has functioned as aforesaid, and in response to an enabling signal on said first signal line, for placing a data sampling signal on said third signal line, sixth control means in said central processor responsive to a data sampling signal on said third signal line for causing said central processor to receive from said common interface a unit of data transferred to it by said secondary processor, means for detecting whether any additional data units await transfer from said secondary processor to said central processor, said detecting means including a descending counter means settable to an initial count value representing the total number of data units to be transferred from said secondary processor to said central processor and responsive to the passage of such data units through said interface for concurrently decrementing said count value until the decremented value indicates that no further data units await transfer, and seventh control means in said central processor responsive to said detecting means and/or to a cycle steal request received from any of said input/output devices when said sixth control means has functioned as aforesaid for causing said central processor to receive data from an input/output device in response to a cycle steal request and for thereafter effecting transfer of an additional unit of data from said secondary processor to said central processor if said detecting means has indicated there is additional data to be transferred between said processors.

3. In a data processing system which has a central processor associated with a plurality of peripheral units including a secondary processor and one or more input/output devices, each of said processors having a microcoded control store and associated addressing means for selecting microwords from said store in a sequence determined at least in part by the operation to be performed, and wherein each of said peripheral units may communicate with said central processor through an interface at least part of which is common to all peripheral units in the system, the interface between said central processor and said secondary processor further including improved features whereby said processors can be synchronously coupled to each other for the joint execution of interrelated procedures and whereby said secondary processor also is able to share the common portion of said interface with the other peripheral units for transferring data to and from said central processor, said improved features comprising:

common timing control means for clocking the respective sequences in which stored microwords are utilized by both of said processors when they are operating conjointly, a first signal line extending between said processors, first control means in said central processor operable to place an enabling signal upon said first signal line when communication is to be established between said processors, a second signal line extending between said processors, second control means in said secondary processor responsive to an enabling signal on said first signal line at a time when no data is to be transferred from said secondary processor to said central processor for placing upon said second signal line a signal denoting that said secondary processor does not require the use of said common interface for data transfer purposes, third control means in said central processor responsive to a signal on said second signal line for conditioning said common interface to function in a cycle steal mode for transferring data between any of said input/output devices and said central processor in response to cycle steal requests from said devices, a third signal line extending between said processors, fourth control means in said secondary processor responsive to an enabling signal on said first signal line at a time when data is to be transferred from said secondary processor to said central processor for placing upon said third signal line a data sampling signal denoting that said secondary processor requires the use of said common interface for data transfer purposes, and fifth control means in said central processor responsive to a data sampling signal on said third signal line for conditioning said common interface to function in an interprocessor mode for transferring data between said secondary processor and said central processor, said secondary processor determining in accordance with its operative microcode whether said second control means or said fourth control means shall be effective in any given instance.

4. In a data processing system which has a central processor associated with a plurality of peripheral units including a secondary processor and one or more input/output devices, each of said processors having a microcoded control store and associated addressing means for selecting microwords from said store in a sequence determined at least in part by the operation to be performed, and wherein each of said peripheral units may communicate with said central processor through an interface at least part of which is common to all peripheral units in the system, the interface between said central processor and said secondary processor further including improved features whereby said processors can be synchronously coupled to each other for the joint execution of interrelated procedures and whereby said secondary processor also is able to share the common portion of said interface with the other peripheral units for transferring data to and from said central processor, said improved features comprising:

common timing control means for clocking the respective sequences in which stored microwords are utilized by both of said processors when they are operating conjointly, a first signal line extending between said processors, first control means in said central processor operable to place an enabling signal upon said first signal line when communication is to be established between said processors, a second signal line extending between said processors, second control means in said secondary processor responsive to an enabling signal on said first signal line when data is available in said secondary processor for transfer to said central processor for placing upon said second signal line a data sampling signal denoting that said secondary processor requires the use of said common interface for data transfer purposes, third control means in said central processor responsive to a data sampling signal on said second signal line for conditioning said common interface to function in an interprocessor mode for transferring a unit of data from said secondary processor to said central processor, fourth control means in said central processor effective in response to a cycle steal request received by said central processor from an input/output device during the absence of a data sampling signal on said second signal line for conditioning said common interface to function in a cycle steal mode for transferring data between said input/output device and said central processor, and fifth control means in said central processor effective when a cycle steal request is received by said central processor from an input/output device concurrently with a data sampling signal on said second signal line for conditioning said common interface to function alternately in an interprocessor mode and a cycle steal mode, thereby enabling said secondary processor and said input/output devices to share the use of said common interface for data transfer purposes.

5. In a data processing system having a microcoded central processor and associated peripheral units including a microcoded secondary processor and one or more input/output devices, all of said peripheral units communicating with said central processor through a common interface for data transfer purposes, improvements providing a synchronous control interface between said secondary processor and said central processor whereby said processors may communicate with each other for coordinating the executions of their respective microcodes when performing joint operations and whereby said secondary processor may time-share the use of said common interface with said input/output devices when access to said central processor for data transfer purposes is required concurrently by said secondary processor and any of said devices, said improvements comprising:

first control means in said central processor effective whenever there is a need for coordinating the operation of said secondary processor with that of said central processor to condition said central processor for activating said control interface, a first signal line extending between said processors, second control means in said central processor effective whenever said first control means has conditioned said central processor as aforesaid for placing an enabling signal upon said first signal line, a second signal line extending between said processors, third control means in said secondary processor effective in response to a first occurrence of an enabling signal on said first signal line for causing said secondary processor to execute a first selected portion of its microcode and for placing upon said second signal line a signal having a duration determined by said selected portion of microcode and the operands to be processed, fourth control means in said central processor effective in response to a signal on said second signal line for conditioning said central processor to perform a selected portion of its microcode which resets said first control means to an ineffective state, thereby terminating said enabling signal, and which further permits at least a limited number of data transfers to take place between said input/output devices and said central processor through said common interface before any data transfer can take place between said processors through said common interface, fifth control means in said central processor effective in response to termination of the signal on said second signal line for setting said first control means again to an active state which causes an enabling signal to be placed upon said first signal line, a third signal line extending between said processors, sixth control means in said secondary processor effective in response to a second occurrence of an enabling signal on said first signal line for causing said secondary processor to execute another selected portion of its microcode as an incident to which a signal is placed upon said third signal line, and seventh control means in said central processor effective in response to a signal on said third signal line for causing said central processor to execute another selected portion of its microcode which permits at least one data transfer to take place between said secondary processor and said central processor before any further data transfer can take place between any of said input/output devices and said central processor.

6. In a data processing system having a microcoded central processor and associated peripheral units including a microcoded secondary processor and one or more input/output devices, all of said peripheral units communicating with said central processor through a common interface for data transfer purposes, improvements providing a synchronous control interface between said secondary processor and said central processor whereby said processors may communicate with each other for coordinating the executions of their respective microcodes when performing joint operations and whereby said secondary processor may share the use of said common interface with said input/output devices for data transfer purposes, said improvements comprising:

a first signal line extending between said processors, first control means in said central processor effective when said central processor is in a condition for receiving data produced by said secondary processor to place an enabling signal upon said first signal line, a second signal line extending between said processors, second control means in said secondary processor effective when said secondary processor is in a condition for transferring a first or only unit of data to said cenral processor and when an enabling signal is present on said first signal line for causing said secondary processor to execute a selected portion of its microcode whereby a data sampling signal is placed upon said second signal line for a limited time and whereby the first or only data unit produced by said secondary processor is made available to said common data transfer interface, third control means in said central processor effective when said central processor is in a condition to receive data from said secondary processor and when a data sampling signal is present on said second control line for causing said central processor to execute a selected portion of its microcode whereby said central processor receives through said common interface the first or only unit of data produced by said secondary processor, and fourth control means in said central processor effective when there is no additional unit of data to be transferred between said processors for causing said central processor to execute a particular portion of its microcode whereby the enabling signal on said first signal line is terminated and said central processor is conditioned to service data transfer requests, if any, from said input/output devices.

7. The improvements recited in claim 6 further comprising:

fifth control means in said secondary processor effective when the first data unit has been transferred from said secondary processor to said central processor and there is an enabling signal on said first signal line for causing said secondary processor to execute a selected portion of its microcode whereby a data sampling signal is placed upon said second signal line and said second data unit is made available to said common interface, sixth control means in said central processor which becomes operative only when a first data unit has been received by said central processor from said secondary processor and there is a second data unit to be transferred between said processors, said sixth control means including a portion thereof which is effective when a data sampling signal is present on said second signal line and no data transfer request from an input/output device is then pending for causing said central processor to execute a predetermined portion of its microcode whereby it receives through said common interface the second unit of data which has been made available to it by said sixth control means.

8. The improvements recited in claim 7 wherein said sixth control means includes a second portion thereof which is effective when a data sampling signal is present on said second signal line and there is a concurrent data transfer request from an input/output device for causing said central processor to execute another predetermined portion of its microcode whereby said central processor first receives through said common interface the second data unit from said secondary processor made available by said fifth control means and then causes said central processor to execute said particular portion of its microcode for servicing the data transfer request from said input/output device.

9. The improvements recited in claim 8 wherein said sixth control means includes a third portion thereof which is effective when no data sampling signal is present on said second signal line and a data transfer request from an input/output device is pending for causing said central processor to execute still another predetermined portion of its microcode whereby the enabling signal on said first signal line is terminated for a limited period, and said central processor is conditioned to service the pending data transfer request during said period, following which the enabling signal is reinstated on said first signal line so that it is again made available to said fifth control means.

10. The improvements recited in claim 9 wherein said fifth control means includes a portion thereof which is rendered effective if the enabling signal on said first signal line is terminated by the third portion of said seventh control means before said second data unit has been received by said central processor for subsequently testing said first signal line to ascertain whether said enabling signal has been reinstated by said sixth control means.

11. In a data processing system having a microcoded central processor and associated peripheral units including a microcoded secondary processor and one or more input/output devices, all of said peripheral units communicating with said central processor through a common interface for data transfer purposes, features providing a synchronous control coupling between said secondary processor and said central processor whereby said processors may communicate directly with each other for coordinating the executions of their respective microcodes when performing conjoint operations and whereby said secondary processor may share the use of said common interface with said input/ouput devices for data transfer purposes, said features comprising:

a first signal line extending between said processors, first control means in said central processor operable to place an enabling signal upon said first signal line when command information is to be passed from said central processor to said secondary processor, second control means in said secondary processor responsive to the first appearance of an enabling signal on said first signal line for conditioning said secondary processor to receive command information from said central processor, third control means in said central processor for terminating said enabling signal after the command information has been passed to said secondary processor, fourth control means in said central processor responsive to the termination of the first enabling signal on said first signal line for conditioning said common interface to function in a cycle steal mode for permitting transfers of data on demand between said central processor and any of said input/output devices, fifth control means in said central processor operable after said secondary processor has processed said command information for conditioning said common interface to function in an interprocessor mode and for placing an enabling signal again upon said first control line to signify that said central processor is ready to receive data from said secondary processors, a second signal line extending between said processors, sixth control means in said secondary processor operable in reponse to the last-mentioned appearance of an enabling signal on said first signal line for placing upon said second signal line a signal of limited duration for indicating that data is ready for transfer from said secondary processor to said central processor and thereafter making such data available to said common interface, and seventh control means in said central processor effective after all of the data made available by said secondary processor has been transferred to said central processor for terminating the enabling signal on said first signal line and conditioning said interface to function in a cycle steal mode.

12. The features of claim 11 in combination with eighth control means in said secondary processor effective after the final termination of the enabling signal on said first signal line for placing a signal upon said second signal line to indicate to said central processor that said secondary processor has completed its operation.

13. In a data processing system having a microcoded central processor and associated peripheral units including a microcoded secondary processor and one or more input/output devices, all of said peripheral units communicating with said central processor through a common interface for data transfer purposes, features providing a synchronous control coupling between said secondary processor and said central processor whereby said processors may communicate directly with each other for coordinating the executions of their respective microcodes when performing conjoint operations and whereby said secondary processor may share the use of said common interface with said input/output devices for data transfer purposes, said features comprising:

a first signal line extending between said processors, first control means in said central processor operable to place an enabling signal upon said first signal line when command information is to be passed from said central processor to said secondary processor, second control means in said secondary processor responsive to the first appearance of an enabling signal on said first signal line for conditioning said secondary processor to receive command information from said central processor, a second signal line extending between said processors, third control means in said secondary processor effective after said command information has been received by said secondary processor for placing upon said second signal line a sampling signal of limited duration indicating that data is available in said secondary processor for transfer to said central processor, fourth control means in said central processor responsive to the sampling signal on said second signal line for conditioning said common interface to function in an interprocessor mode for receiving at least some of the data available in said secondary processor, fifth control means in said central processor effective after a predetermined amount of data has been transferred from said secondary processor to said central processor for terminating the enabling signal on said first signal line and conditioning said common interface to function in a cycle steal mode for permitting a transfer of data on demand between said control processor and any of said input/output devices, sixth control means in said central processor effective after said interface has functioned in a cycle steal mode for a limited time to place an enabling signal again upon said first control line and to condition said interface for functioning in an interprocessor mode, seventh control means in said secondary processor responsive to the last-mentioned appearance of an enabling signal on said first signal line for placing a sampling signal upon said second control line and making additional data available to said common interface for transfer to said central processor, and eighth control means in said central processor effective after all of the data has been transferred from said secondary processor to said central processor for terminating the enabling signal on said first signal line and conditioning said common interface to function in a cycle steal mode.

14. The features of claim 13 in combination with ninth control means in said secondary processor effective after the final termination of the enabling signal on said first signal line for placing a signal upon said second signal line to indicate to said central processor that said secondary processor has completed its operation.

* * * * *